(12) United States Patent
Wang et al.

(10) Patent No.: US 11,640,020 B2
(45) Date of Patent: May 2, 2023

(54) DISPLAY DEVICE

(71) Applicant: BOE TECHNOLOGY GROUP CO., LTD., Beijing (CN)

(72) Inventors: Wei Wang, Beijing (CN); Xiaochuan Chen, Beijing (CN); Jiayao Liu, Beijing (CN); Qiuyu Ling, Beijing (CN); Xianqin Meng, Beijing (CN); Xiandong Meng, Beijing (CN); Pengxia Liang, Beijing (CN); Fangzhou Wang, Beijing (CN); Peilin Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 358 days.

(21) Appl. No.: 16/765,583

(22) PCT Filed: Apr. 22, 2019

(86) PCT No.: PCT/CN2019/083717
§ 371 (c)(1),
(2) Date: May 20, 2020

(87) PCT Pub. No.: WO2020/215184
PCT Pub. Date: Oct. 29, 2020

(65) Prior Publication Data
US 2021/0231845 A1    Jul. 29, 2021

(51) Int. Cl.
*G02B 5/18* (2006.01)
*G02B 27/42* (2006.01)

(52) U.S. Cl.
CPC ......... *G02B 5/1842* (2013.01); *G02B 5/1814* (2013.01); *G02B 27/4205* (2013.01)

(58) Field of Classification Search
CPC   G02B 5/1842; G02B 5/1814; G02B 27/4205; G02B 5/18; G02B 27/42
See application file for complete search history.

(56) References Cited

U.S. PATENT DOCUMENTS

2012/0249537 A1    10/2012    Bae et al.
2013/0335795 A1    12/2013    Song et al.
(Continued)

FOREIGN PATENT DOCUMENTS

CN    102608767 A    7/2012
CN    104520749 A    4/2015
(Continued)

*Primary Examiner* — Kimberly N. Kakalec
(74) *Attorney, Agent, or Firm* — Dave Law Group LLC; Raj S. Dave

(57) ABSTRACT

A display device is disclosed, and the display device includes a display layer and a lens layer; the lens layer is provided on a light emergent side of the display layer, and includes at least one grating compound lens unit; the display layer includes at least one display pixel set, and the display pixel set is configured to emit light for imaging toward the grating compound lens unit during display; the grating compound lens unit is configured to optically image the display pixel set; and the grating compound lens unit is further configured to deflect the light for imaging, to make an image-space central visual field direction of the grating compound lens unit intersect with an extension direction of an optical axis of the grating compound lens unit, so that the display device has one or more viewpoints.

18 Claims, 14 Drawing Sheets

(56) References Cited

U.S. PATENT DOCUMENTS

| | | | |
|---|---|---|---|
| 2014/0118829 A1 | 5/2014 | Ma et al. | |
| 2015/0097853 A1* | 4/2015 | Bastani | G09G 5/10 345/589 |
| 2017/0293148 A1 | 10/2017 | Park et al. | |
| 2017/0363794 A1* | 12/2017 | Wan | G02B 30/33 |
| 2018/0227576 A1* | 8/2018 | Fattal | H04N 13/32 |
| 2018/0259691 A1* | 9/2018 | Wang | G02F 1/133504 |

FOREIGN PATENT DOCUMENTS

| | | |
|---|---|---|
| CN | 104755968 A | 7/2015 |
| CN | 108710217 A | 10/2018 |

\* cited by examiner

DISPLAY DEVICE

CROSS-REFERENCE TO RELATED APPLICATIONS

This patent application is the National Stage Entry of PCT/CN2019/083717 filed on Apr. 22, 2019 the entire disclosure of which is incorporated herein by reference as part of the present application.

TECHNICAL FIELD

Embodiments of the present disclosure relate to a display device.

BACKGROUND

With development of a display technology and improvement of living standards, consumers demand higher and higher on a display device. For example, consumers not only expect that a display device can display a high-quality display picture, but also expect that the display device can have a relatively small thickness and weight.

SUMMARY

At least an embodiment of the present disclosure provides a display device, comprising a display layer and a lens layer; the lens layer is provided on a light emergent side of the display layer, and includes at least one grating compound lens unit; the display layer includes at least one display pixel set, and the display pixel set is configured to emit light for imaging toward the grating compound lens unit during display; the grating compound lens unit is configured to optically image the display pixel set; and the grating compound lens unit is further configured to deflect the light for imaging, to make an image-space central visual field direction of the grating compound lens unit intersect with an extension direction of an optical axis of the grating compound lens unit, so that the display device has one or more viewpoints.

For example, in at least an example of the display device, the grating compound lens unit includes a lens unit and a grating unit; the lens unit is configured to optically image the display pixel set; and the grating unit is configured to deflect the light for imaging, so that the image-space central visual field direction of the grating compound lens unit intersects with an extension direction of an optical axis of the lens unit.

For example, in at least an example of the display device, the lens layer further includes a central lens arranged in parallel with the grating compound lens unit; the display layer further includes a central display pixel set arranged in parallel with the display pixel set; the central display pixel set is configured to emit light for imaging toward the central lens during display; the central lens is configured to allow the light for imaging that is emitted by the central display pixel set to form an imaging point of the central display pixel set; and the grating unit is configured to enable an imaging point of the display pixel set and the imaging point of the central display pixel set are spliced into at least a portion of an image to be displayed of the display device by making the image-space central visual field direction of the grating compound lens unit intersect with the extension direction of the optical axis of the lens unit.

For example, in at least an example of the display device, the lens unit and the grating unit are attached to and stacked with each other; and the lens unit is closer to the display layer than the grating unit.

For example, in at least an example of the display device, the lens unit and the grating unit are integrated into a phase-type lens; and the phase-type lens is configured to deflect the image-space central visual field direction of the grating compound lens unit from the optical axis of the lens unit while imaging the display pixel set.

For example, in at least an example of the display device, a phase of the lens unit is symmetrically distributed with respect to a center of the grating compound lens unit; and a phase of the grating compound lens unit is asymmetrically distributed with respect to the center of the grating compound lens unit.

For example, in at least an example of the display device, the grating unit includes a plurality of grating lines, and alignment directions of the plurality of grating lines are parallel to each other.

For example, in at least an example of the display device, the grating unit includes a plurality of grating sub-regions; and the plurality of grating sub-regions are configured to deflect light incident to different grating sub-regions toward different directions, so that the display device has of the more viewpoints.

For example, in at least an example of the display device, an arrangement mode of the plurality of viewpoints is row arrangement, cross arrangement, matrix arrangement, or snow-flake like arrangement.

For example, in at least an example of the display device, the grating compound lens unit includes a first grating compound lens sub-region and a second grating compound lens sub-region; an included angle between an image-space central visual field direction of the first grating compound lens sub-region and an optical axis of a lens unit of the first grating compound lens sub-region is a first angle, and an included angle between an image-space central visual field direction of the second grating compound lens sub-region and an optical axis of a lens unit of the second grating compound lens sub-region is a second angle; the first angle is not equal to the second angle, so that the grating compound lens unit forms different viewpoints.

For example, in at least an example of the display device, the first grating compound lens sub-region includes a first grating sub-region, and the second grating compound lens sub-region includes a second grating sub-region; a grating period of the first grating sub-region and a grating period of the second grating sub-region are different from each other; and a grating line direction of a grating unit of the first grating sub-region and a grating line direction of a grating unit of the second grating sub-region are the same; or the grating line direction of the grating unit of the first grating sub-region and the grating line direction of the grating unit of the second grating sub-region are different from each other; and the grating period of the first grating sub-region and the grating period of the second grating sub-region are the same.

For example, in at least an example of the display device, a grating period of the first grating sub-region and a grating period of the second grating sub-region are different from each other; and a grating line direction of the grating unit of the first grating sub-region and a grating line direction of the grating unit of the second grating sub-region are different from each other.

For example, in at least an example of the display device, the lens layer includes a plurality of grating compound lens units; the plurality of grating compound lens units include a first grating compound lens unit and a second grating compound lens unit; the second grating compound lens unit is farther away from the center of the lens layer than the first grating compound lens unit; and a grating period of the second grating compound lens unit is smaller than a grating period of the first grating compound lens unit.

For example, in at least an example of the display device, a phase difference value of a grating unit of the second grating compound lens unit is greater than a phase difference value of a grating unit of the first grating compound lens unit; the phase difference value of the grating unit of the second grating compound lens unit is a difference between a maximum phase of the grating unit of the second grating compound lens unit and a minimum phase of the grating unit of the second grating compound lens unit; and the phase difference value of the grating unit of the first grating compound lens unit is a difference between a maximum phase of the grating unit of the first grating compound lens unit and a minimum phase of the grating unit of the first grating compound lens unit.

For example, in at least an example of the display device, the display pixel set includes at least one display pixel; and an orthogonal projection of the display pixel set on the lens layer is located within the grating compound lens unit.

For example, in at least an example of the display device, the center of the grating compound lens unit is spaced apart from the center of the lens layer; and a center of the orthogonal projection of the display pixel set on the lens layer substantially coincides with the center of the grating compound lens unit.

For example, in at least an example of the display device, the display layer further includes a spacing region provided around the display pixel set to space apart adjacent display pixel sets; and the spacing region is configured as a non-display region; and the display pixel set includes a plurality of the display pixels; the spacing region includes a plurality of driving elements; and the plurality of driving elements are used to drive the corresponding display pixel set.

For example, in at least an example of the display device, the display device further comprises a spacing layer, the spacing layer is provided between the display layer and the lens layer; phase distribution of the lens unit φlens(R) satisfies an expression below:

$$\varphi_{lens}(R) = -n\frac{2\pi}{\lambda}\left(\sqrt{(R-R_n)^2 + f^2} - f\right);$$

where R is a vector from an orthogonal projection of the center of the lens layer on the spacing layer to a position within the orthogonal projection of the grating compound lens unit on the spacing layer, Rn is a vector from the orthogonal projection of the center of the lens layer on the spacing layer to the orthogonal projection of the center of the grating compound lens unit on the spacing layer, f is a focal length of the grating compound lens unit, n is a refractive index of the spacing layer, and λ is an effective operating wavelength of the display device.

For example, in at least an example of the display device, phase distribution of the grating unit φgrating(R) and the grating period P1 respectively satisfy expressions below:

$$\varphi_{grating}(R) = \frac{2\pi}{\lambda}(R - R_n) \cdot R_{11} \times \sin(\theta);$$

$$P1 = \frac{\lambda}{n \times \sin(\theta)};$$

where θ is an included angle between a vector $r_n$ of the image-space central visual field direction of the grating compound lens unit and a vector t in a normal direction of the spacing layer, and r// is a projection vector of the vector $r_n$ of the image-space central visual field direction of the grating compound lens unit on the spacing layer.

For example, in at least an example of the display device, the grating compound lens unit is at least one selected from the group consisting of a binary optical lens, a lens based on super-surface phase control, and a lens based on a holographic material.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1A:
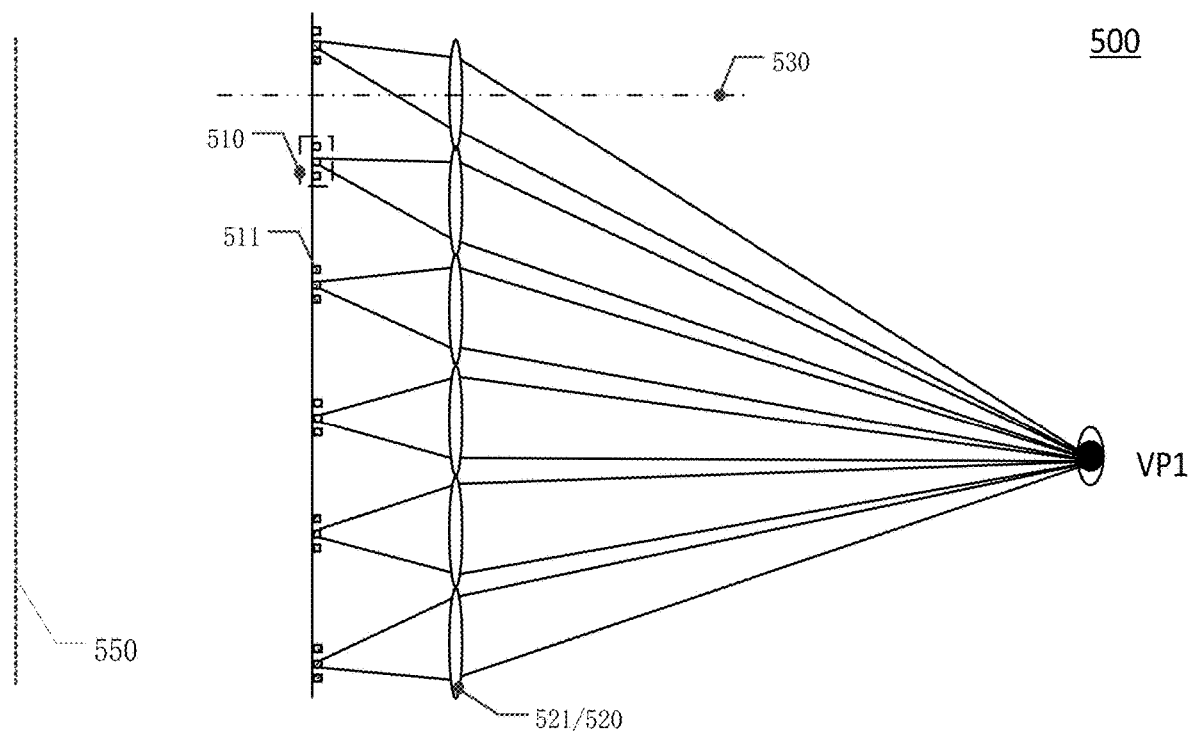
FIG. 1A is a cross-sectional schematic diagram and optical path diagram of a display device.
Figure 1B:
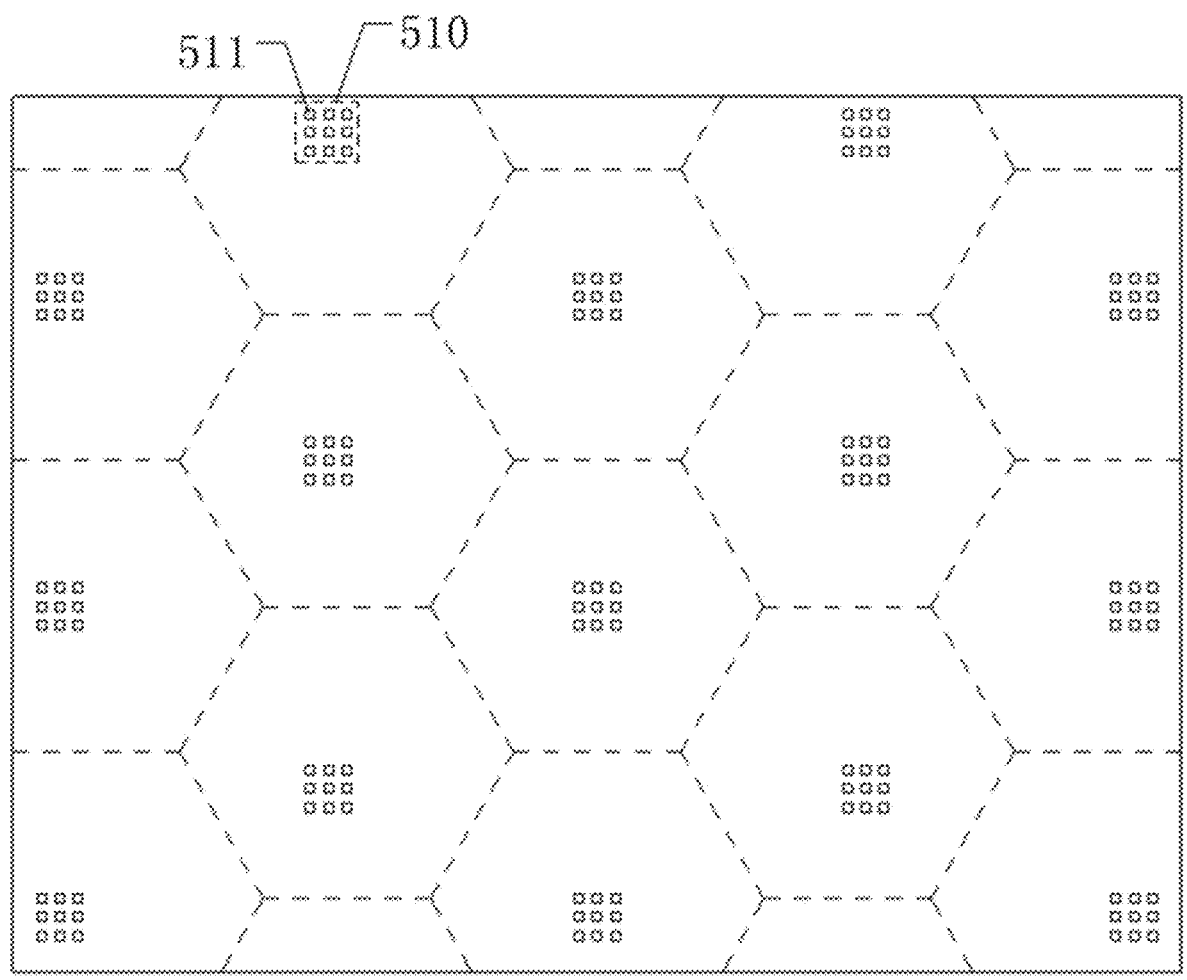
FIG. 1B is a plan schematic diagram of the display device shown in FIG. 1A.

FIG. 1A is a cross-sectional schematic diagram of a display device 500; FIG. 1B shows a plan schematic diagram of the display device 500 shown in FIG. 1A; and the display device 500, for example, may be applied to virtual reality glasses. As shown in FIG. 1A, the display device 500 comprises a display layer and a lens layer 520. The display layer includes display pixel sets 510 arranged in an array, and a display pixel set 510 includes at least one display pixel 511. The lens layer 520 includes lens units 521 arranged in an array.

In the study, inventors of the present application have noted that: in the display device 500 shown in FIG. 1A and FIG. 1B, centers of orthogonal projections of part of the lens units in the plurality of lens units 521 on the display layer are spaced apart from centers of corresponding display pixel sets 510, that is, a display pixel set 510 (e.g., a center of the display pixel set 510) is spaced apart from an optical axis 530 of a corresponding lens unit 521. For example, as shown in FIG. 1A and FIG. 1B, part of the display pixel sets 510 have at least a portion of region disposed outside orthogonal projections of corresponding lens units 521 on the display layer, so that light emitted from different display pixel sets 510 can all be transmitted to a corresponding viewpoint (e.g., a first viewpoint VP1), and further, image points of different display pixel sets 510 can be spliced into an image to be displayed on an image surface 550 of the display device 500.

Figure 1C:
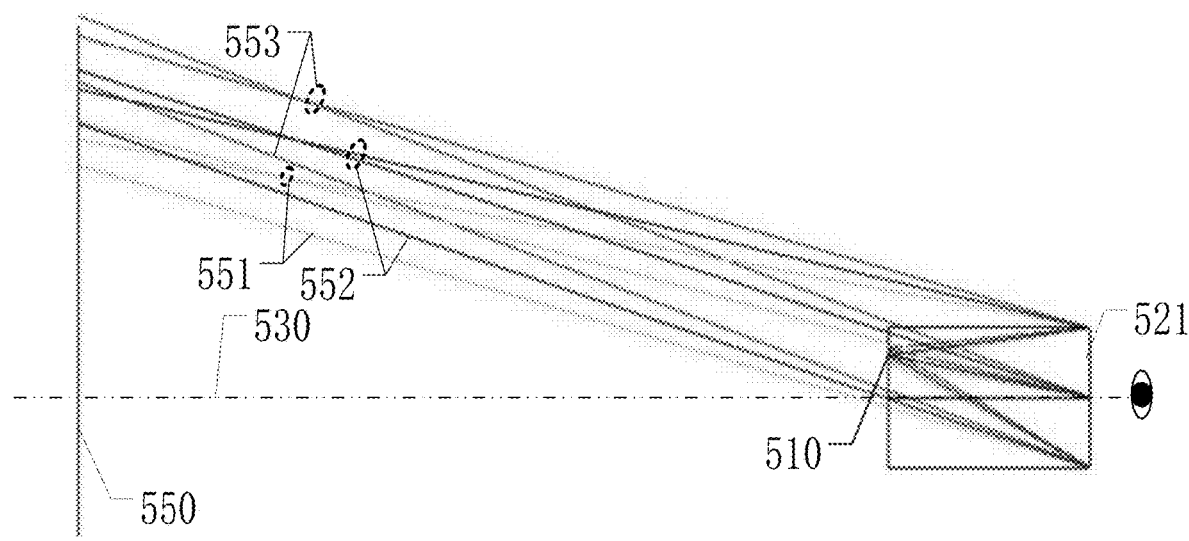
FIG. 1C is a simulation diagram of imaging a display pixel set by a lens unit in a case of off-axis imaging.

However, in this case, an included angle between light emitted from a display pixel set 510 and an optical axis 530 of a corresponding lens unit 521 is relatively large; and at this time, imaging of the display pixel set 510 by the lens unit 521 is off-axis imaging, which results in relatively large aberration and relatively poor imaging quality. FIG. 1C shows a simulation result diagram of imaging of a display pixel set 510 by a single lens unit 521 in a case of off-axis imaging (10°±1.5°). Here, light 552 represents light corresponding to a main visual angle (10°), light 551 represents light corresponding to the main visual angle (10°)−1.5°, and light 553 represents light corresponding to the main visual angle (10°)+1.5°. As shown in FIG. 1C, in the case of off-axis imaging, sizes of light spots formed by the light 551, the light 552 and the light 553 on the image surface 550 of the display device 500 are all relatively large, which means that in the case of off-axis imaging (10°±1.5°), quality of imaging the display pixel set 510 by the lens unit 521 has not met actual application needs. Therefore, a view angle of the display device 500 cannot be increased by providing more lens units 521, and thus an overall angle of visual field of the display device 500 shown in FIG. 1A is relatively small (e.g., smaller than 10°).

In the study, the inventors of the present application have noted that: imaging quality of the display device 500 shown in FIG. 1A may be improved by increasing a focal length of the lens unit 521. Firstly, when the focal length of the lens unit 521 increases, a curvature of the lens unit 521 decreases (a radius of curvature increases), so a thickness of the lens unit 521 decreases with position, and a phase of the lens unit 521 decreases with position, so that an adverse effect of a processing error of the lens unit 521 on imaging quality will be reduced, and correspondingly, imaging quality of the lens unit 521 is improved. Secondly, when the focal length of the lens unit 521 increases, in the case where the angle of visual field is fixed, a distance between the lens unit 521 and the display pixel set 510 increases when the focal length of the lens unit 521 increases, and a maximum value of an included angle between light emitted by the display pixel set 510 and received by the lens unit 521 and the optical axis of the lens unit 521 decreases, so an off-axis degree of imaging the display pixel set 510 by the lens unit 521 decreases (i.e., approaches more closely to paraxial imaging), so that imaging quality of the lens unit 521 is improved. However, the inventor of the present application notices that: a technical solution of improving imaging quality of the display device 500 by increasing the focal length of the lens unit 521 will increase a thickness of the display device 500 (e.g., make the thickness of the display device 500 greater than 1 cm), which goes against consumers' requirements for the display device 500. In addition, the inventor of the present application further notices that: in the display device shown in FIG. 1A and FIG. 1B, pitches between the centers of the orthogonal projections of different lens units 521 on the display layer and the centers of the corresponding display pixel sets 510 are different from each other, which means that the display pixel sets 510 are distributed unevenly in the display layer, thereby increasing difficulty in fabricating the display layer.

At least one embodiment of the present disclosure provides a display device, and the display device comprises a display layer and a lens layer, wherein the lens layer is provided on a light emergent side of the display layer, and includes at least one grating compound lens unit; the display layer includes at least one display pixel set, and the display pixel set is configured to emit light for imaging toward the grating compound lens unit during display; the grating compound lens unit is configured to optically image the display pixel set; and the grating compound lens unit is further configured to deflect the light for imaging, to make an image-space central visual field direction of the grating compound lens unit intersect with an extension direction of an optical axis of the grating compound lens unit, so that the display device have one or more viewpoints.

In some examples, the grating compound lens unit may be used to image the display pixel set and deflect the light for imaging, so that the image-space central visual field direction of the grating compound lens unit intersects with the extension direction of the optical axis of the grating compound lens unit, and thus, the display pixel set may be imaged by paraxial imaging. Therefore, quality of imaging the display layer by the lens layer may be improved, which, thus, may reduce a focal length of the lens layer and/or improve an image-space field of view of the display device.

In some examples, the lens layer includes a plurality of grating compound lens units arranged in an array, and an image-space central visual field direction of each grating compound lens unit intersects with an extension direction of an optical axis of the grating compound lens unit, thereby making an image-space central visual field direction of each grating compound lens unit intersect with an overall imaging optical axis of a grating compound lens unit array. For example, the overall imaging optical axis of the grating compound lens unit array (i.e., the imaging optical axis of the lens layer) refers to a normal passing through a lens layer plane of a pupil center of a human eye. For example, an image-space central visual field direction of each grating compound lens unit intersects with a same point on the imaging optical axis of the lens layer, and thus forms one viewpoint of the display device. For example, the imaging optical axis of the lens layer is perpendicular to the lens layer.

Figure 2:
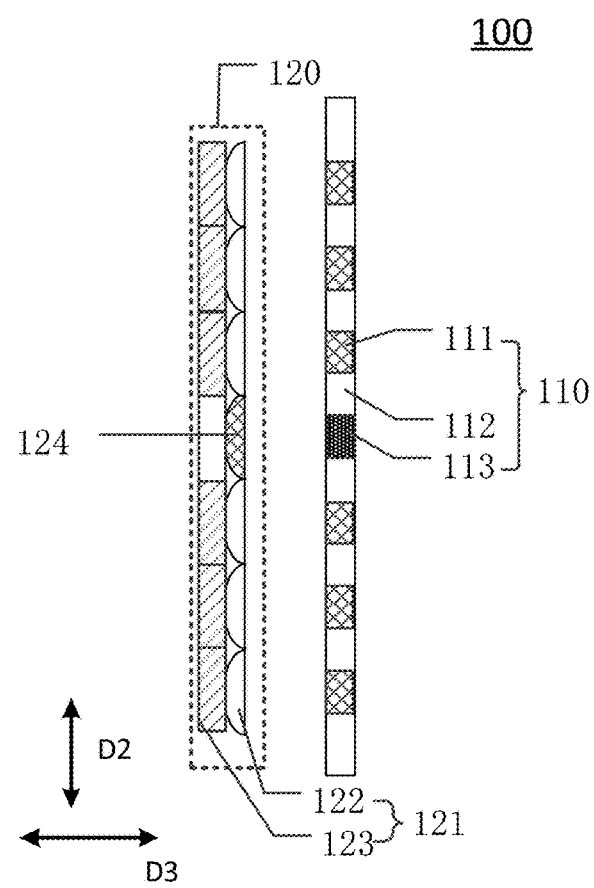
FIG. 2 is a cross-sectional schematic diagram of a display device provided by an embodiment of the present disclosure.
Figure 3A:
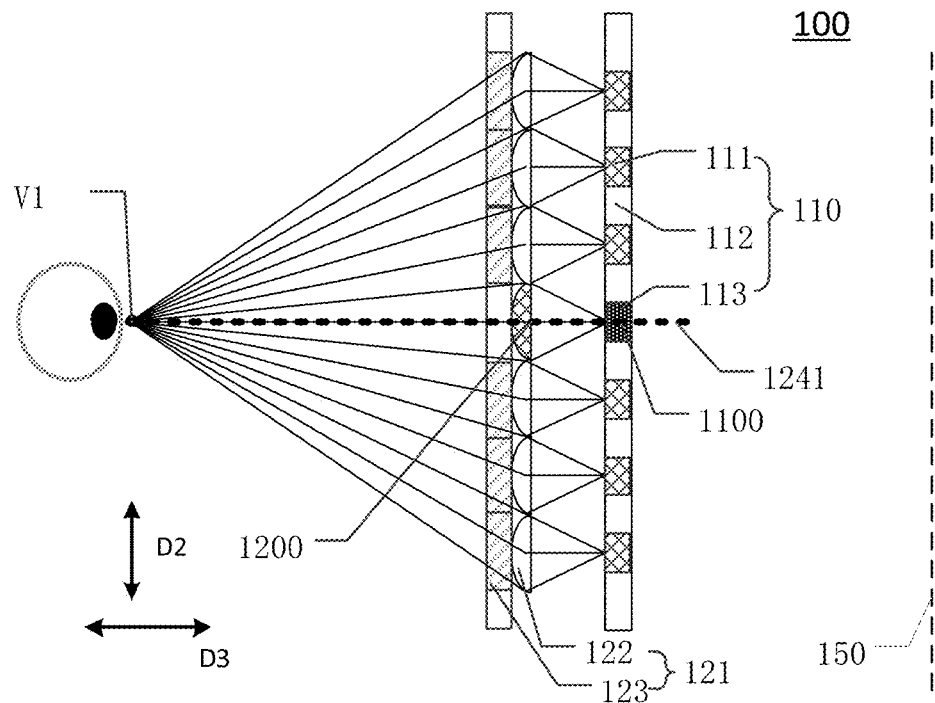
FIG. 3A is a schematic optical path diagram of the display device shown in FIG. 2.
Figure 4A:
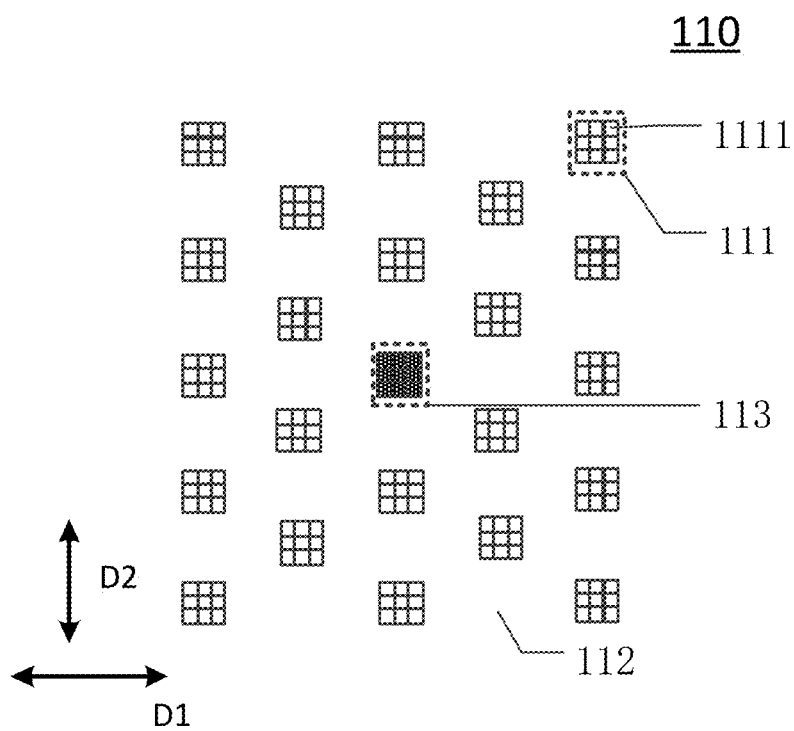
FIG. 4A is a plan schematic diagram of a display layer provided by the embodiment of the present disclosure.

FIG. 2 shows a cross-sectional schematic diagram of a display device 100 provided by an embodiment of the present disclosure. FIG. 3A is a schematic optical path diagram of the display device 100 shown in FIG. 2. The display device 100, for example, may be applied to virtual reality glasses. As shown in FIG. 3A, the display device 100 comprises a display layer 110 and a lens layer 120, and the lens layer 120 is provided on a light emergent side of the display layer 110. For example, the display layer 110 and the lens layer 120 are stacked in a third direction D3. For example, a center 1200 of the lens layer coincides with an orthogonal projection of a center 1100 of the display layer on the lens layer 120. For example, the lens layer 120 may include a plurality of lens units (e.g., grating compound lens units 121). FIG. 4A is a plan schematic diagram of the display layer 110 provided by the embodiment of the present disclosure. As shown in FIG. 4A, the display layer 110 includes a central display pixel set 113 and display pixel sets 111 arranged in an array around the central display pixel set 113, which are arranged in an array within a plane parallel to a first direction D1 and a second direction D2; a display pixel set 111 includes at least one display pixel 1111. For example, the number and arrangement mode of display pixels included in the central display pixel set 113 may be the same as the number and arrangement mode of display pixels 1111 in the display pixel set 111, and no details will be repeated here. For example, the first direction D1 and the second direction D2 intersect with each other (e.g., vertically); the third direction D3 and the first direction D1 intersect with each other (e.g., vertically); and the third direction D3 and the second direction D2 intersect with each other (e.g., vertically).

It should be noted that, although FIG. 4A exemplarily shows that each display pixel set 111 includes nine display pixels, the embodiment of the present disclosure is not limited thereto. According to actual application needs, each display pixel set 111 may further include one display pixel, two display pixels, twelve display pixels, or other number of display pixels. For example, making the display pixel set 111 include a plurality of display pixels may ensure or improve resolution and display effect of the display device in the case where a size of a lens unit is fixed, and reduce difficulty in fabricating the display device (since it is not necessary to fabricate a lens unit with a size too small). When the display pixel set 111 includes a plurality of display pixels, grayscales of the plurality of display pixels may be independently controlled. For example, light emitted from a plurality of display pixels 1111 included by each display pixel set 111 may have intensities different from each other, and may be used to form an image sub-region or image sub-picture of an image to be displayed of the display device 100. For example, an image sub-region formed based on each display pixel set 111 and an image sub-region formed based on other display pixel set 111 may be combined with each other on an image surface 150 of the display device to form a larger-sized image.

Figure 4B:
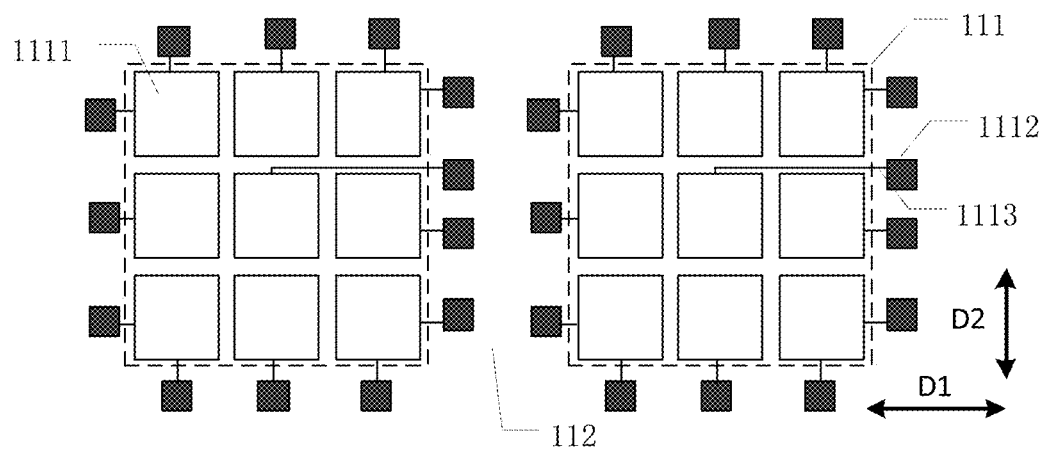
FIG. 4B is a plan schematic diagram of a display pixel set and a spacing region provided by the embodiment of the present disclosure.

As shown in FIG. 4A, the display layer 110 further includes a spacing region 112 provided around a display pixel set 111 to space apart adjacent display pixel sets 111; and the spacing region 112 is configured as a non-display region. FIG. 4B shows a plan schematic diagram of a display pixel set 111 and a spacing region 112 provided by the embodiment of the present disclosure. As shown in FIG. 4B, in one example, the spacing region 112 includes a plurality of driving elements 1112; and each driving element 1112 may be connected with a corresponding display pixel 1111 through a conductor 1113 and used to drive a corresponding display pixel set 111. The driving element 1112, for example, may include a thin film transistor. For example, by providing the driving element 1112 in the spacing region 112, more display pixels 1111 may be provided in the display pixel set 111, so that resolution of the display device 100 may be improved. In another example, the display pixel 1111 includes the driving element 1112, that is, the driving element 1112 is provided in the display pixel set 111. In still another example, an ordinary display panel may also be used as the display layer 110 according to the embodiment of the present disclosure, so that a selection range of a display panel may be increased; and in this case, the display pixel 1111 in the spacing region 112 is in a non-operating state during display.

Figure 5A:
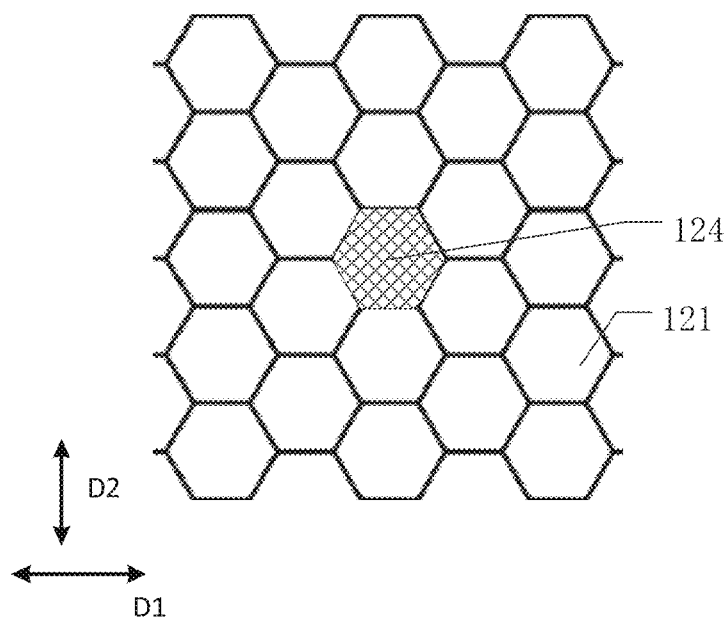
FIG. 5A is a plan schematic diagram of a lens layer provided by the embodiment of the present disclosure.

FIG. 5A is a plan schematic diagram of a lens layer 120 provided by the embodiment of the present disclosure. For example, as shown in FIG. 5A, the lens layer 120 includes a central lens 124 located at a center of the lens layer 120 and grating compound lens units 121 arranged in an array around the central lens 124. For example, a center of the central lens 124 coincides with the center 1200 of the lens layer, and in this case, a center of a grating compound lens unit 121 is spaced apart from the center 1200 of the lens layer. It should be noted that, although FIG. 5A shows that the lens layer 120 includes a plurality of grating compound lens units 121, yet according to actual application needs, the lens layer 120 may further include only one grating compound lens unit 121. In some examples, as shown in FIG. 5A, orthogonal projections of the central lens 124 and the grating compound lens units 121 on the display layer 110 are all regular hexagons; and in this case, the grating compound lens units 121 are hexagonally densely distributed around the central lens 124, so that a space utilization rate of the display layer 110 may be improved. In other examples, the orthogonal projections of the central lens 124 and the grating compound lens units 121 on the display layer 110 may also be triangles (e.g., equilateral triangles), rectangles, or other suitable shapes, and no details will be repeated here.

Figure 5B:
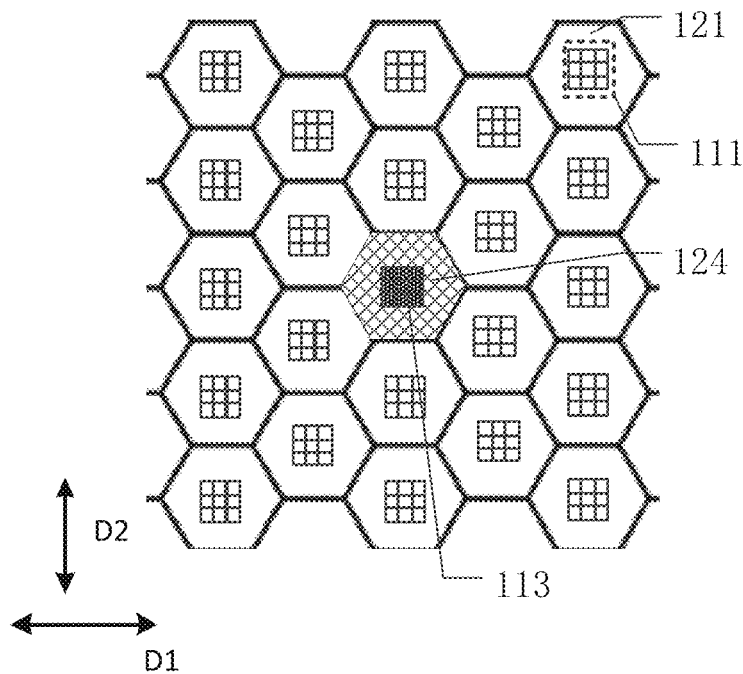
FIG. 5B is a schematic diagram of an orthogonal projection of the display layer shown in FIG. 4A on the lens layer shown in FIG. 5A.

FIG. 5B shows a schematic diagram of the orthogonal projection of the display layer 110 on the lens layer 120. As shown in FIG. 5B, a plurality of display pixel sets 111 correspond to a plurality of grating compound lens units 121 one by one, and orthogonal projections of the plurality of display pixel sets 111 on the lens layer 120 are located within corresponding grating compound lens units 121; an orthogonal projection of the central display pixel set 113 on the lens layer 120 is located within the central lens 124. In some examples, as shown in FIG. 5B, the orthogonal projection of the central display pixel set 113 on the lens layer 120 substantially coincides with the center of the central lens 124. In some examples, as shown in FIG. 5B, centers of the orthogonal projections of the plurality of display pixel sets 111 on the lens layer 120 substantially coincide with centers of the corresponding grating compound lens units 121. For example, the centers of the orthogonal projections of the plurality of display pixel sets 111 on the lens layer 120 may completely coincide with the centers of the corresponding grating compound lens units 121. For example, when there is an alignment error between the display layer 110 and the lens layer 120, there may be a tiny pitch between the centers of the orthogonal projections of the plurality of display pixel sets 111 on the lens layer 120 and the centers of the corresponding grating compound lens units 121 (e.g., less than 5% of the size of the display pixel set 111), for example, the tiny pitch may reduce (slightly reduce) quality of imaging the plurality of display pixel sets 111 by the lens layer 120, but quality of imaging the plurality of display pixel sets 111 by the lens layer 120 is still greater than imaging quality of an ordinary lens layer.

Figure 3B:
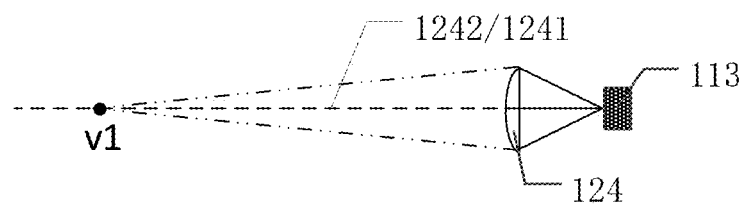
FIG. 3B is a schematic optical path diagram of a central lens of the display device shown in FIG. 2.
Figure 3C:
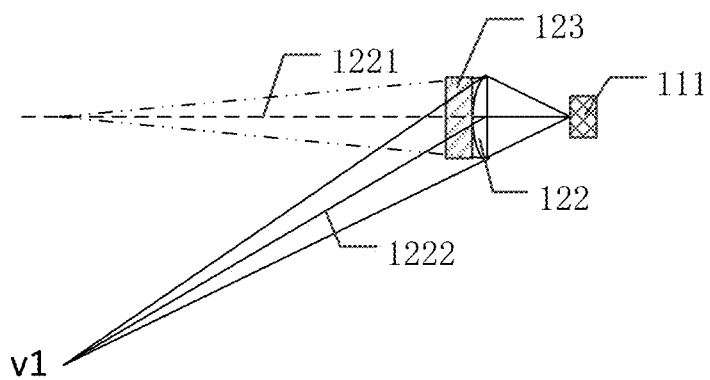
FIG. 3C is a schematic optical path diagram of a grating compound lens unit of the display device shown in FIG. 2.

Hereinafter, the principle of imaging the display layer 110 by the lens layer 120 of the display device 100 shown in FIG. 2 will be exemplarily described with reference to FIG. 3A to FIG. 3C. FIG. 3B is a schematic optical path diagram of the central lens 124 of the display device 100 shown in FIG. 2; and FIG. 3C is a schematic optical path diagram of the grating compound lens unit 121 of the display device 100 shown in FIG. 2.

As shown in FIG. 3A and FIG. 3B, the central display pixel set 113 is configured to emit light for imaging toward the central lens 124 during display. The central lens 124 allows at least a portion of the light for imaging that is incident onto the central lens 124 to be transmitted to a first viewpoint V1 located on an exit pupil plane of the display device 100, thereby causing the light for imaging that is emitted by the central display pixel set 113 to form an imaging point of the central display pixel set 113 on the image surface 150 of the display device. As shown in FIG. 3A and FIG. 3B, an image-space central visual field direction 1242 of the central lens coincides with an optical axis 1241 of the central lens. For example, the first viewpoint V1 is located in the exit pupil of the display device 100, and has a diameter of, for example, about 0.8 mm to 1.5 mm; in some examples, the first viewpoint V1 forms the exit pupil of the display device 100; and in other examples, the display device 100 has viewpoints, and the first viewpoint V1 forms the exit pupil of the display device 100 together with other viewpoints. It should be noted that, in the example and other examples of the embodiment of the present disclosure, the imaging point may be a single image pixel, or may also be an image sub-region or image sub-picture composed of a plurality of image pixels.

For example, as shown in FIG. 3B, the image-space central visual field direction 1242 of the central lens 124 is a transmission direction of the light emitted from the display layer 110 and incident to an optical center of the central lens 124 after leaving the central lens 124.

As shown in FIG. 3A and FIG. 3B, both the center of the central display pixel set 113 and the center of the central lens 124 may be located on the optical axis 1241 of the central lens. For example, as shown in FIG. 3A and FIG. 3B, the first viewpoint V1 may also be located on the optical axis 1241 of the central lens, so that quality of an image observed by a user may be improved.

As shown in FIG. 3A, the grating compound lens unit 121 includes a lens unit 122 and a grating unit 123; a focal length of the lens unit 122 is, for example, equal to a focal length of the central lens 124; and the focal length of the lens unit 122 and the focal length of the central lens 124 are, for example, both equal to a pitch between the lens layer 120 and the display layer 110. As shown in FIG. 3C, the display pixel set 111 is configured to emit the light for imaging toward the grating compound lens unit 121 during display. The grating compound lens unit 121 is further configured to deflect the light for imaging, to make an image-space central visual field direction 1222 of the grating compound lens unit 121 intersect with an extension direction of an optical axis of the grating compound lens unit 121 (i.e., an optical axis 1221 of the lens unit). It should be noted that, in the embodiment of the present disclosure, the optical axis of the grating compound lens unit 121 refers to the optical axis 1221 of the lens unit of the grating compound lens unit 121.

For example, as shown in FIG. 3C, the image-space central visual field direction 1222 of the grating compound lens unit 121 is a transmission direction of the light emitted from the display layer 110 and incident to an optical center of the grating compound lens unit 121 after leaving the grating compound lens unit 121.

As shown in FIG. 3A and FIG. 3C, the lens unit 122 is configured to image the display pixel set 111. For example, as shown in FIG. 3C, in the case where the grating unit 123 is not provided, the image-space central visual field direction of the grating compound lens unit 121 coincides with the lens unit optical axis 1221. It should be noted that, in the case where the grating unit 123 is not provided, the image-space central visual field direction of the grating compound lens unit 121 is equal to a central visual field direction of the lens unit 122; and a region enclosed by a dotted line in FIG. 3C may be referred to for the image-space field of view of the lens unit 122. As shown in FIG. 3A and FIG. 3C, the grating unit 123 is configured to deflect the light for imaging to make the image-space central visual field direction 1222 of the grating compound lens unit 121 deviate from the optical axis 1221 of the lens unit 122.

For example, the grating unit 123 is configured to deflect the image-space central visual field direction (and a corresponding image-space optical path) of the grating compound lens unit 121 from the extension direction of the optical axis 1221 of the lens unit 122 to a predetermined visual field direction, so an imaging point of the display pixel set 111 and the imaging point of the central display pixel set 113 can be spliced into at least a portion of the image to be displayed of the display device 100.

For example, as shown in FIG. 3A and FIG. 3C, the grating unit 123 is configured to deflect the image-space central visual field direction 1222 of the grating compound lens unit 121, so that at least a portion of light emitted from the display pixel set 111 is transmitted to the first viewpoint V1 located on the exit pupil plane of the display device 100, and thus the imaging point of the display pixel set 111 formed by the grating compound lens unit 121 and the imaging point of the central display pixel set 113 formed by the central lens 124 can be spliced into at least a portion of the image to be displayed (e.g., spliced into a larger-sized image on the image surface 150 of the display device).

For example, as shown in FIG. 3A, in the case where the display layer 110 includes a plurality of display pixel sets 111 and the lens layer 120 includes a plurality of grating compound lens units 121, the plurality of grating compound lens units 121 may deflect corresponding image-space central visual field directions by predetermined angles, so that a plurality of imaging points of the corresponding display pixel sets 111 formed by the plurality of grating compound lens units 121 and the imaging point of the central display pixel set 113 formed by the central lens 124 can be spliced into an image to be displayed. For example, the plurality of grating units 123 of the plurality of grating compound lens units 121 are configured to deflect the image-space central visual field directions 1222 of the corresponding grating compound lens units 121, so that at least a portion of the light emitted from the plurality of display pixel sets 111 is all transmitted to the first viewpoint V1 located on the exit pupil plane of the display device 100 (e.g., the image-space central visual field directions 1222 of the plurality of grating compound lens units 121 all pass through the first viewpoint V1), and thus the imaging points of the corresponding display pixel sets 111 formed by the plurality of grating compound lens units 121 and the imaging point of the central display pixel set 113 formed by the central lens 124 can be spliced into an image to be displayed. For example, pixels of adjacent display pixel sets 111 are closely adjacent to each other, so that a continuous and non-overlapping picture may be formed. In some examples, a display pixel 1111 with a relatively small size may be selected; correspondingly, a lens unit 122 with a relatively large magnification may be selected, and no details will be repeated here.

In some examples of the display device 100 provided by the embodiment of the present disclosure, not only imaging of the central display pixel set 113 by the central lens 124 is paraxial imaging, but also imaging of the display pixel set 111 by the grating compound lens unit 121 is paraxial imaging, so that imaging quality of the lens layer 120 is improved. Therefore, as compared with the solution of off-axis imaging adopted by the display device 500 shown in FIG. 1A and FIG. 1B, the grating compound lens unit 121 may reduce imaging aberration of the lens layer 120 and enhance quality of imaging the display pixel set 111 by the lens layer 120. In this case, when the focal length of the lens layer 120 is fixed, the grating compound lens unit 121 may increase a view angle of the lens layer 120 (e.g., raise the view angle of the lens layer 120 to more than ±60°); and when the view angle is fixed, the focal length of the lens layer 120 may be reduced (e.g., the focal length of the lens layer 120 is less than 1 mm), which, thus, may reduce a thickness of the display device 100 and improve use experience of the user. In addition, as compared with the display device 500 shown in FIG. 1A and FIG. 1B, as shown in FIG. 4A, the display pixels 1111 may be evenly arranged on the display layer 110, which, thus, can not only reduce difficulty in designing and fabricating the display layer 110, but also reduce difficulty in aligning the display layer 110 with the lens layer 120. It should be noted that, paraxial imaging of a lens refers to that an included angle θ between light for imaging and an optical axis of the lens is relatively small, and meets approximate conditions below: sin θ≈θ, and cos θ≈1; for example, θ≤±3°. In some examples of the present disclosure, that imaging of the display pixel set 111 by the grating compound lens unit 121 is paraxial imaging refers to that an included angle between light in an object-space field of view of the grating compound lens unit 121 and the lens optical axis is relatively small.

As shown in FIG. 3A, the lens unit 122 and the grating unit 123 may be attached to each other and stacked on the light emergent side of the display layer 110. In some examples, as shown in FIG. 3A, the lens unit 122 is closer to the display layer 110 than the grating unit 123, in which case, the grating unit 123 will not affect the object-space field of view of the grating compound lens unit 121, and thus, imaging quality of the grating compound lens unit 121 may be further improved.

Figure 6A:
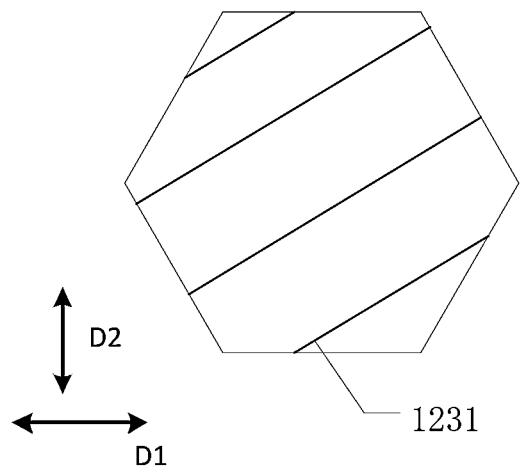
FIG. 6A is a plan schematic diagram of a grating unit provided by the embodiment of the present disclosure.

FIG. 6A is a plan schematic diagram of a grating unit 123 provided by the embodiment of the present disclosure. As shown in FIG. 6A, the grating unit 123 includes a plurality of grating lines 1231, alignment directions (i.e., extension directions) of the plurality of grating lines 1231 are parallel to each other, an included angle between the grating line 1231 of the grating unit 123 and the second direction D2 (an acute angle) is an alignment angle of the grating unit 123; and a pitch between adjacent grating lines 1231 (a pitch in a direction perpendicular to the extension direction of the grating line 1231) is a grating period of the grating unit 123.

For example, at least one grating compound lens unit 121 of the lens layer 120 includes a first grating compound lens unit and a second grating compound lens unit; the second grating compound lens unit is farther from the center 1200 of the lens layer than the first grating compound lens unit; a grating period of the second grating compound lens unit is smaller than a grating period of the first grating compound lens unit, so that an included angle between a central visual field direction of the second grating compound lens unit and an optical axis of a lens unit of the second grating compound lens unit is larger than an included angle between an image-space central visual field direction of the first grating compound lens unit and an optical axis of a lens unit of the first grating compound lens unit, and thus, at least a portion of light emitted by a display pixel set 111 corresponding to the second grating compound lens unit and at least a portion of light emitted by a display pixel set 111 corresponding to the first grating compound lens unit may both be transmitted to the first viewpoint V1 located on the exit pupil plane of the display device 100.

Figure 6B:
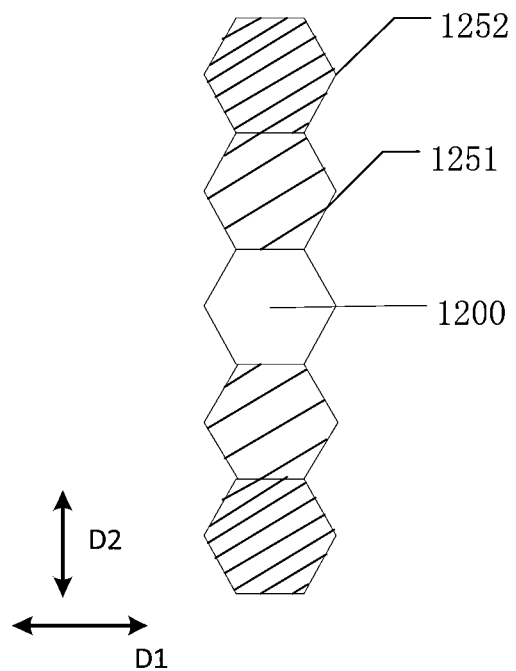
FIG. 6B is a plan schematic diagram of a column of grating units provided by the embodiment of the present disclosure.

Hereinafter, exemplary description will be provided in conjunction with FIG. 6B. FIG. 6B is a plan schematic diagram of a column of grating units 123 provided by the embodiment of the present disclosure; as shown in FIG. 6B, with respect to a plurality of grating compound lens units arranged along the second direction D2, the second grating compound lens unit is farther away from the center 1200 of the lens layer than the first grating compound lens unit; and a grating period of a grating unit 1252 included by the second grating compound lens unit is smaller than a grating period of a grating unit 1251 included by the first grating compound lens unit. According to a grating equation, it can be known that: the smaller the grating period, the larger the diffraction angle. Therefore, a deflection angle of light by the grating unit 1252 included by the second grating compound lens unit is larger than a deflection angle of light by the grating unit 1251 included by the first grating compound lens unit, further, the included angle between the image-space central visual field direction of the second grating compound lens unit and the optical axis of the lens unit of the second grating compound lens unit is larger than the included angle between the image-space central visual field direction of the first grating compound lens unit and the optical axis of the lens unit of the first grating compound lens unit; and in this case, at least a portion of light emitted by the display pixel set 111 corresponding to the second grating compound lens unit and at least portion of light emitted by the display pixel set 111 corresponding to the first grating compound lens unit may both be transmitted to the first viewpoint V1 located on the exit pupil plane of the display device 100, and an imaging point of the display pixel set 111 formed by the first grating compound lens unit and an imaging point of the display pixel set 111 formed by the second grating compound lens unit, as well as the imaging point of the central display pixel set 113 formed by the central lens 124 can be spliced into at least a portion of an image to be displayed (e.g., can be spliced into at least a portion of the image to be displayed on the image surface 150 of the display device).

For example, along a direction from the center of the lens layer 120 toward an edge of the lens layer 120, the grating period of the grating unit 123 of the grating compound lens unit 121 may be gradually reduced so that along the direction from the center of the lens layer 120 toward the edge of the lens layer 120, a deflection angle of the image-space central visual field direction of the grating compound lens unit 121 gradually increases, and further the imaging points of the corresponding display pixel sets 111 formed by the plurality of grating compound lens units 121 and the imaging point of the central display pixel set 113 formed by the central lens 124 can be spliced into an image to be displayed (e.g., a continuous and non-overlapping picture). For example, in some examples, the grating compound lens unit 121 may form a plurality of viewpoints by imaging the display pixel sets 111, which will be exemplarily described below in conjunction with FIG. 7A and FIG. 7B.

Figure 7A:
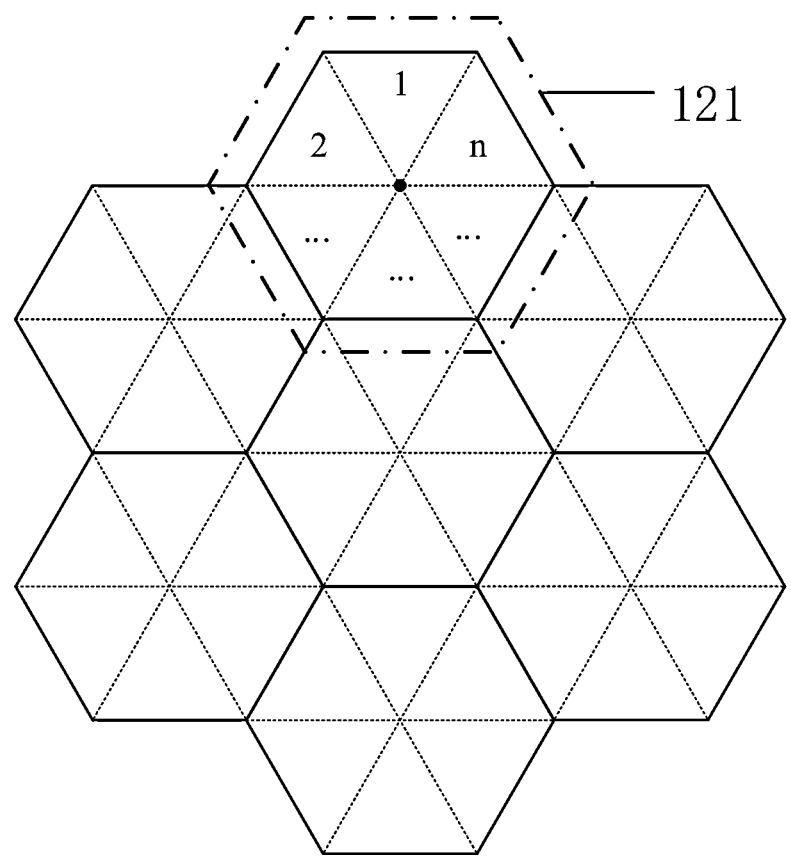
FIG. 7A is a plan schematic diagram of another lens layer provided by the embodiment of the present disclosure.
Figure 7B:
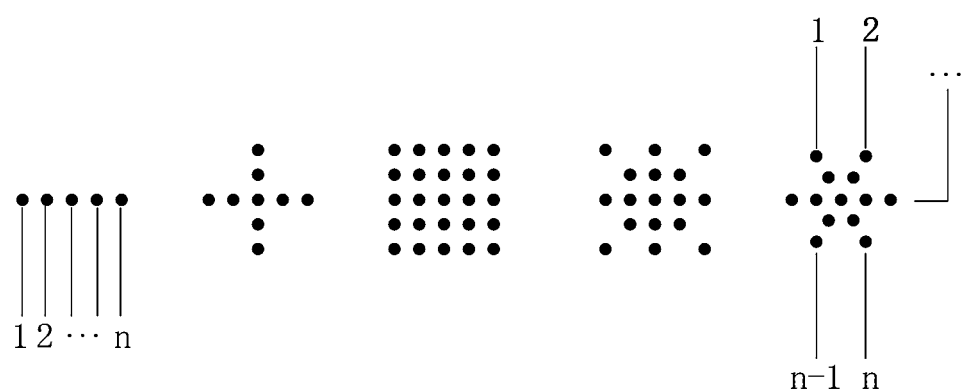
FIG. 7B is various arrangement forms of a plurality of viewpoints supplied by the display device provided by the embodiment of the present disclosure.

FIG. 7A shows a plurality of grating compound lens unit sub-regions of the grating compound lens unit 121, and FIG. 7B shows a plurality of viewpoints formed by the grating compound lens unit 121. For example, as shown in FIG. 7A, the grating compound lens unit 121 may include a plurality of grating compound lens unit sub-regions (sub-region 1, sub-region 2, . . . , sub-region n), and the plurality of grating compound lens unit sub-regions are configured to form a plurality of viewpoints (viewpoint 1, viewpoint 2, . . . , viewpoint n) based on light incident onto the grating compound lens unit 121. For example, the plurality of grating compound lens unit sub-regions may be configured to form n viewpoints shown in FIG. 7B; and images corresponding to the n viewpoints may be a same image, that is, images corresponding to different viewpoints have a same color and gray-scale distribution. In this case, during movement of the user's eyes, the user may also continuously view the image displayed by the display device 100, that is, the grating compound lens unit 121 shown in FIG. 7A may increase an eye box or observation window of the display device 100, and thus can enhance use experience of the user.

For example, a shape of a grating compound lens unit sub-region, an arrangement mode of the plurality of grating compound lens unit sub-regions in the grating compound lens unit 121, as well as an arrangement form of the plurality of viewpoints may be set according to actual application needs, which will not be specifically limited in the embodiment of the present disclosure.

For example, as shown in FIG. 7A, in the case where the grating compound lens unit 121 is a hexagon, a grating compound lens unit sub-region may be a triangle, and one vertex of the triangle coincides with the center of the grating compound lens unit 121. For example, the grating compound lens unit 121 may include six, twelve, eighteen, or other suitable number of grating compound lens unit sub-regions, and no details will be repeated here. It should be noted that, in the case where the grating compound lens unit 121 has other shape, the grating compound lens unit sub-regions may be arranged with reference to FIG. 7A, and no details will be repeated here.

For example, as shown in FIG. 7B, the arrangement mode of then viewpoints formed by the grating compound lens unit 121 may be row arrangement (i.e., then viewpoints being arranged in a row), cross arrangement (i.e., the n viewpoints being arranged in a row and a column that are perpendicular to each other), matrix arrangement, snowflake like arrangement, or other suitable arrangement, and no details will be repeated here. In some examples, a pitch between adjacent viewpoints is smaller than a pupil diameter, so that light field display may be implemented in the case where adjacent viewpoints (different viewpoints) are respectively loaded with corresponding light field images; and in other examples, a pitch between adjacent viewpoints may also be larger than the pupil diameter, so that the observation window (observation region) of the human eye may be expanded in the case where adjacent viewpoints (different viewpoints) are respectively loaded with a same image. In addition, the above-described light field display may also have an effect of expanding the observation window of the human eye.

For example, a principle of forming the plurality of viewpoints by the grating compound lens unit 121 will be exemplarily described below by taking that the grating compound lens unit 121 includes the first grating compound lens unit sub-region and the second grating compound lens unit sub-region as an example.

For example, the grating unit 123 includes a first grating sub-region and a second grating sub-region, and the lens unit 122 includes a first lens sub-region corresponding to the first grating sub-region and a second lens sub-region corresponding to the second grating sub-region; the first grating sub-region and the first lens sub-region are combined with each other to form the first grating compound lens unit sub-region, and the second grating sub-region and the second lens sub-region are combined with each other to form the second grating compound lens unit sub-region. Light emitted by the display pixel set 111 for imaging includes first light incident onto the first lens sub-region and the first grating sub-region and second light incident onto the second lens sub-region and the second grating sub-region; the first lens sub-region is configured to image the display pixel set 111 based on the first light, the second lens sub-region is configured to image the display pixel set 111 based on the second light; the first grating sub-region is configured to deflect an image-space central visual field direction of a region of the grating compound lens unit 121 that corresponds to the first grating sub-region (i.e., a first grating compound lens sub-region) from an optical axis of a lens unit of the first grating compound lens sub-region by a first angle, the second grating sub-region is configured to deflect an image-space central visual field direction of a region of the grating compound lens unit 121 that corresponds to the second grating sub-region (i.e., a second grating compound lens sub-region) from an optical axis of a lens unit of the second grating compound lens sub-region by a second angle; in the example, the first angle is not equal to the second angle, so that different viewpoints may be formed based on the grating compound lens unit 121.

For example, at least one of a grating period of the first grating sub-region, a grating period of the second grating sub-region, a direction of a grating line 1231 of a grating unit 123 of the first grating sub-region, and a direction of a grating line 1231 of a grating unit 123 of the second grating sub-region may be adjusted so that the image-space central visual field direction of the region of the grating compound lens unit 121 that corresponds to the first grating sub-region and the image-space central visual field direction of the region of the grating compound lens unit 121 that corresponds to the second grating sub-region are deflected by different angles.

For example, the grating period of the first grating sub-region and the grating period of the second grating sub-region are different from each other; and the direction of the grating line 1231 of the grating unit 123 of the first grating sub-region and the direction of the grating line 1231 of the grating unit 123 of the second grating sub-region are the same. For another example, the direction of the grating line 1231 of the grating unit 123 of the first grating sub-region and the direction of the grating line 1231 of the grating unit 123 of the second grating sub-region are different from each other; and the grating period of the first grating sub-region and the grating period of the second grating sub-region are the same. For another example, the grating period of the first grating sub-region and the grating period of the second grating sub-region are different from each other; and the direction of the grating line 1231 of the grating unit 123 of the first grating sub-region and the direction of the grating line 1231 of the grating unit 123 of the second grating sub-region are different from each other.

Hereinafter, an implementation mode of the display layer 110 and colorized display will be exemplarily described.

For example, the display layer 110 may be implemented as a self-luminous display panel (e.g., an organic light-emitting display panel), a liquid crystal display panel, or other suitable display panel. For example, the display layer 110 may be used to output a monochrome image. For another example, the display layer 110 may also be used to output a color image. For example, display of a color image may be implemented by using any one of two methods below.

In a first method, the display layer 110 may include a first display pixel for emitting light having a first color, a second display pixel for emitting light having a second color, and a third display pixel for emitting light having a third color; and the first color, the second color and the third color are, for example, red, green and blue.

For example, the first display pixel, the second display pixel and the third display pixel may correspond to a same grating compound lens unit 121; and the grating compound lens unit 121 includes a lens unit 122, a first grating sub-layer, a second grating sub-layer and a third grating sub-layer that are sequentially stacked, for example, orthogonal projections of the first grating sub-layer, the second grating sub-layer and the third grating sub-layer on the display layer 110 completely coincide with each other; operating wavelengths of the first grating sub-layer, the second grating sub-layer and the third grating sub-layer respectively correspond to the first color, the second color and the third color, so that the grating compound lens unit 121 can make light of different colors have a same deflection angle, which, thus, can suppress or eliminate a problem of ghosting caused by dispersion (emergent angles of light of different colors being different from each other). For example, the first grating sub-layer, the second grating sub-layer and the third grating sub-layer do not have a deflection effect on light with a wavelength that is not an operating wavelength. For example, the first grating sub-layer does not have a deflection effect on the light of the second color and the third color.

For another example, the first display pixel, the second display pixel and the third display pixel may also respectively correspond to three different grating compound lens units 121, whereby light output by the first display pixel, the second display pixel and the third display pixel may be directly imaged through different grating compound lens units 121 respectively, and the light output by the first display pixel, the second display pixel and the third display pixel (a plurality of first display pixels, second display pixels, and third display pixels) may be superimposed on a virtual image surface into a complete color picture without ghost or crosstalk.

In a second method, the display layer 110 includes a time-sequential backlight and a light intensity modulation layer; the time-sequential backlight has light sources (e.g., light-emitting diodes (LEDs)) of three colors, which may sequentially output light of the first color, light of the second color and light of the third color to the light intensity modulation layer within a display period of one frame of image; the light intensity modulation layer respectively modulates the light of the first color, the light of the second color and the light of the third color to form a midway film of the first color, a midway film of the second color and a midway film of the third color; and the user's eyes may perceive a color picture by synthesizing the midway film of the first color, the midway film of the second color and the midway film of the third color. For example, in the method, a suitable method (e.g., a grating compound lens unit formed by a lens unit, a first grating sub-layer, a second grating sub-layer and a third grating sub-layer that are stacked) may also be used to suppress or eliminate the ghosting problem caused by dispersion of the grating compound lens unit, and no details will be repeated here It should be noted that, the grating compound lens unit of the display device provided by the embodiment of the present disclosure is not limited to include the grating unit and the lens unit that are separately provided. According to actual application needs, the grating compound lens unit of the display device provided by the embodiment of the present disclosure may further include a grating unit and a lens unit that are integrated. Hereinafter, exemplary description will be provided in conjunction with FIG. 8 and FIG. 9.

Figure 8:
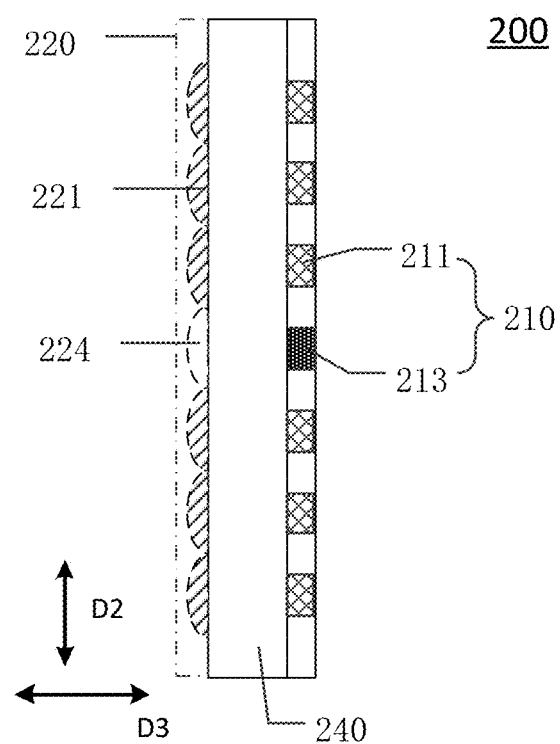
FIG. 8 is a cross-sectional schematic diagram of another display device provided by an embodiment of the present disclosure.
Figure 9:
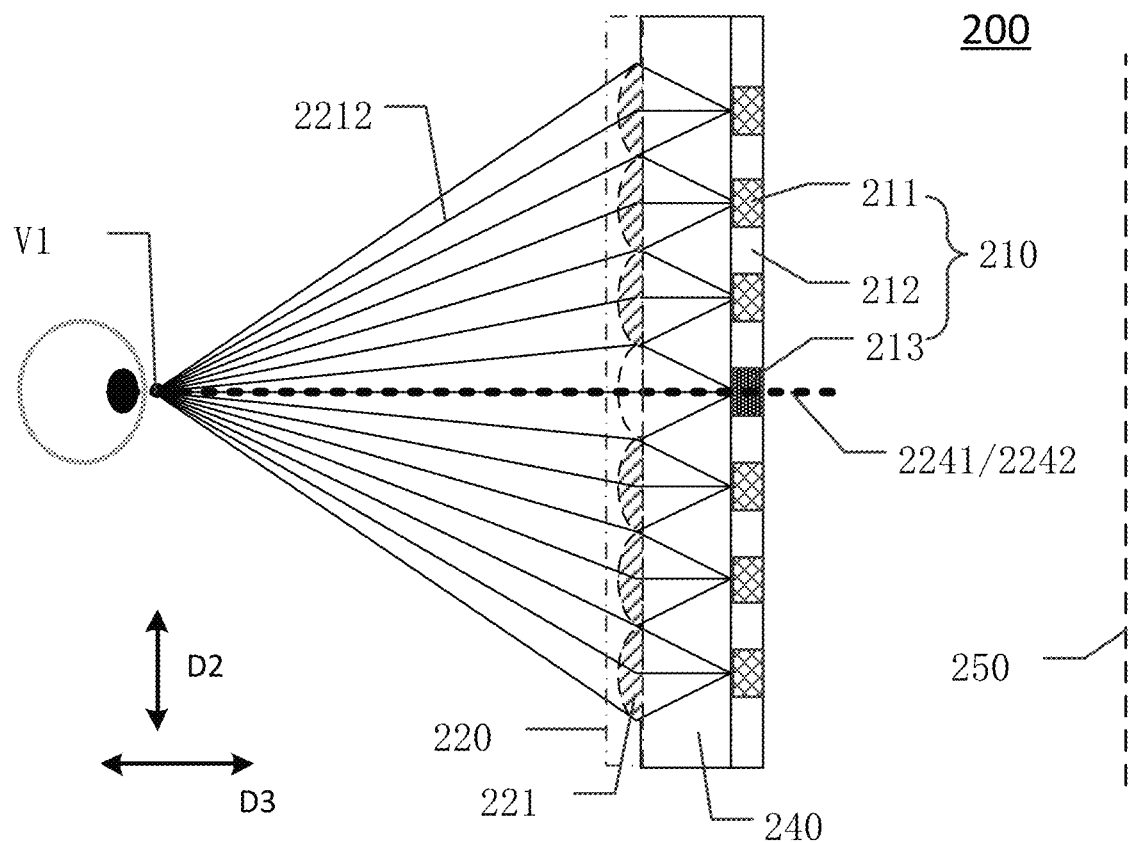
FIG. 9 is a schematic optical path diagram of the display device shown in FIG. 8.

FIG. 8 shows a cross-sectional schematic diagram of another display device 200 provided by an embodiment of the present disclosure. FIG. 9 is a schematic optical path diagram of the display device 200 shown in FIG. 8. The display device 200, for example, may be applied to virtual reality glasses. As shown in FIG. 8, the display device 200 comprises a display layer 210 and a lens layer 220. For example, a center of the lens layer 220 may coincide with an orthogonal projection of a center of the display layer 210 on the lens layer 220.

As shown in FIG. 8, the display layer 210 includes a central display pixel set 213 and display pixel sets 211 arranged in an array around the central display pixel set 213;

the display pixel set 211 includes at least one display pixel; and an arrangement mode of the central display pixel set 213 is similar to an arrangement mode of the display pixel set 211. For example, the example shown in FIG. 2 may be referred to for a specific arrangement mode of a display pixel layer, and no details will be repeated here.

As shown in FIG. 8, the lens layer 220 includes a central lens 224 and a plurality of grating compound lenses 221 arranged in an array around the central lens 224. It should be noted that, although FIG. 8 shows that the lens layer 220 includes a plurality of grating compound lenses 221, the embodiment of the present disclosure is not limited thereto, for example, in some examples, the lens layer 220 may further include only one grating compound lens 221, and no details will be repeated here. For example, a center of the central lens 224 may coincide with a center of the lens layer 220. In this case, a center of the grating compound lens unit 221 is spaced apart from the center of the lens layer 220.

As shown in FIG. 8, the plurality of display pixel sets 211 correspond to the plurality of grating compound lens units 221 one by one, and orthogonal projections of the plurality of display pixel sets 211 on the lens layer 220 are located within corresponding grating compound lens units 221; an orthogonal projection of the central display pixel set 213 on the lens layer 220 is located within the central lens 224. In some examples, a center of the orthogonal projection of the central display pixel set 213 on the lens layer 220 substantially coincides with the center of the central lens 224; and centers of the orthogonal projections of the plurality of display pixel sets 211 on the lens layer 220 substantially coincide with centers of the corresponding grating compound lens units 221.

As shown in FIG. 8 and FIG. 9, the central display pixel set 213 is configured to emit light for imaging toward the central lens 224 during display. The central lens 224 allows at least a portion of the light for imaging that is incident onto the central lens 224 to be transmitted to a first viewpoint V1 located on an exit pupil plane of the display device 200, thereby causing the light for imaging that is emitted by the central display pixel set 213 to form an imaging point of the central display pixel set 213 on an image surface of the display device 200. As shown in FIG. 8 and FIG. 9, an image-space central visual field direction 2242 of the central lens 224 coincides with an optical axis 2241 of the central lens.

As shown in FIG. 8 and FIG. 9, the center of the central display pixel set 213 and the center of the central lens 224 may both be located on the optical axis 2241 of the central lens. For example, as shown in FIG. 8 and FIG. 9, the first viewpoint V1 may also be located on the optical axis 2241 of the central lens, in which case, a user may see a more symmetrical image, so that quality of the image observed by the user may be improved.

As shown in FIG. 9, the display pixel set 211 is configured to emit light for imaging toward the grating compound lens unit 221 during display. The grating compound lens unit 221 includes a lens unit and a grating unit, as shown in FIG. 8 and FIG. 9, the lens unit and the grating unit are integrated into a phase-type lens, and the phase-type lens is configured to deflect the light for imaging while imaging the display pixel set 211 so that the image-space central visual field direction 2212 of the grating compound lens unit 221 intersects with an extension direction of an optical axis of the grating compound lens 221 (e.g., so that the image-space central visual field direction 2212 of the grating compound lens unit 221 passes through the first viewpoint V1), and thus, an imaging point of the display pixel set 211 and the imaging point of the central display pixel set 213 can be spliced into at least a portion of an image to be displayed of the display device 200.

For example, the phase-type lens is configured to deflect the image-space central visual field direction of the grating compound lens unit from the optical axis of the lens unit while imaging the light emitted from the display pixel set.

Hereinafter, the lens unit, the grating unit and the grating compound lens unit 221 will be described in conjunction with FIG. 10A to FIG. 10E.

Figure 10A:
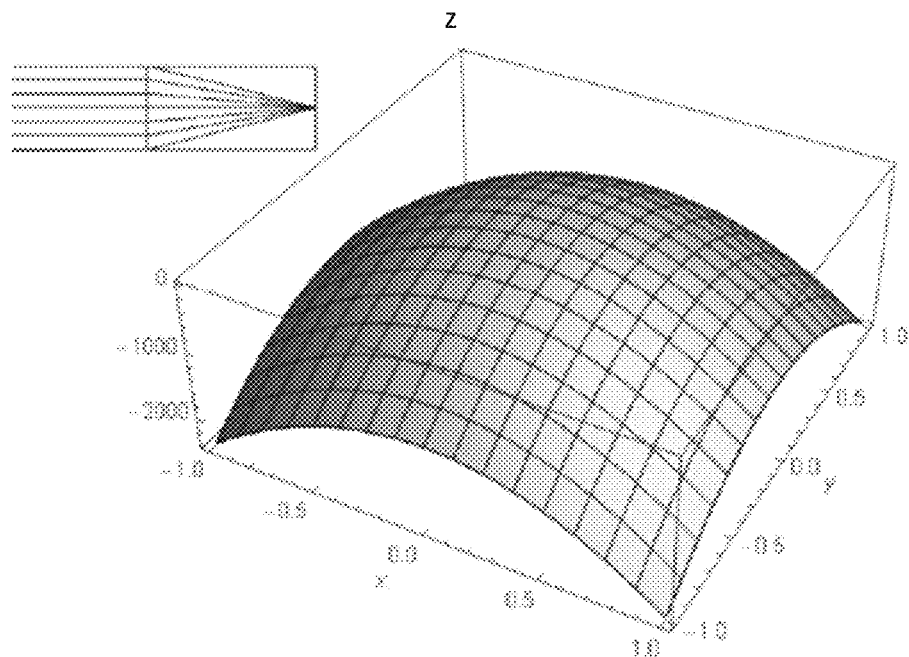
FIG. 10A is a schematic phase distribution diagram of a lens unit of a grating compound lens unit in FIG. 8.

FIG. 10A exemplarily shows phase distribution of the lens unit included by the grating compound lens unit 221 in FIG. 9 (a z axis represents the phase of the lens unit). As shown in FIG. 10A, the phase of the lens unit is symmetrically distributed with respect to the center (x=0, y=0) of the grating compound lens 221, and the lens unit is configured to implement a function of imaging the display pixel set 211 (e.g., converging or collimating light incident thereon).

Figure 10B:
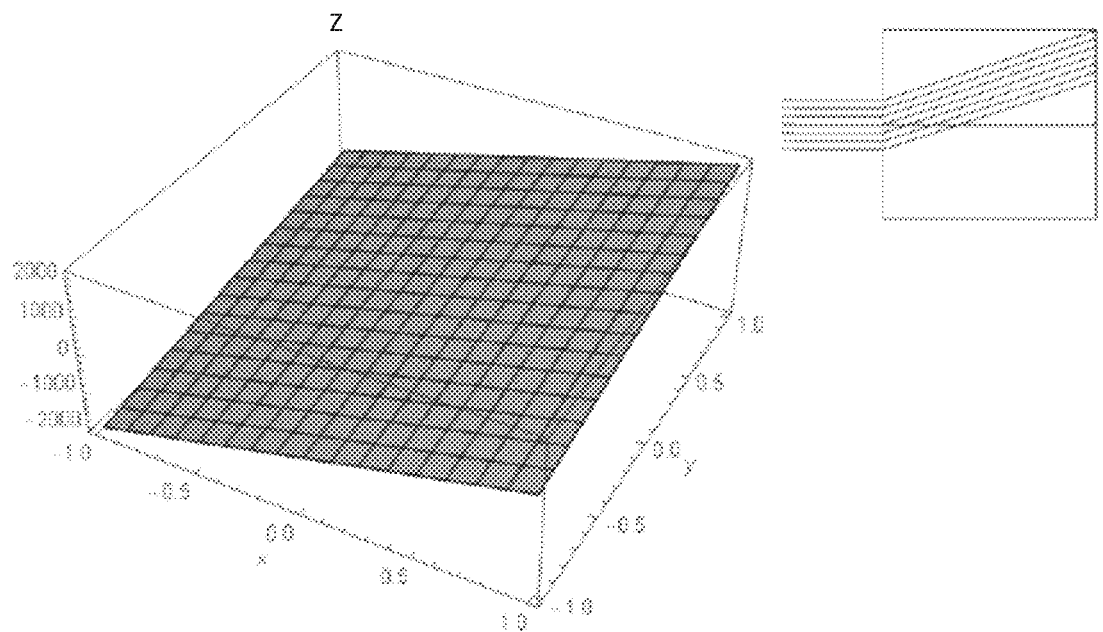
FIG. 10B is a schematic phase distribution diagram of the grating unit of the grating compound lens unit in FIG. 8.

FIG. 10B exemplarily shows phase distribution of the grating unit included by the grating compound lens unit 221 in FIG. 9 (the z axis represents the phase of the grating unit). As shown in FIG. 10B, the phase of the grating unit is asymmetrically distributed with respect to the center (x=0, y=0) of the grating compound lens 221, and the phase of the grating unit satisfies, for example, the law of linear change. As shown in FIG. 10B, the grating unit may deflect light incident thereon.

Figure 10C:
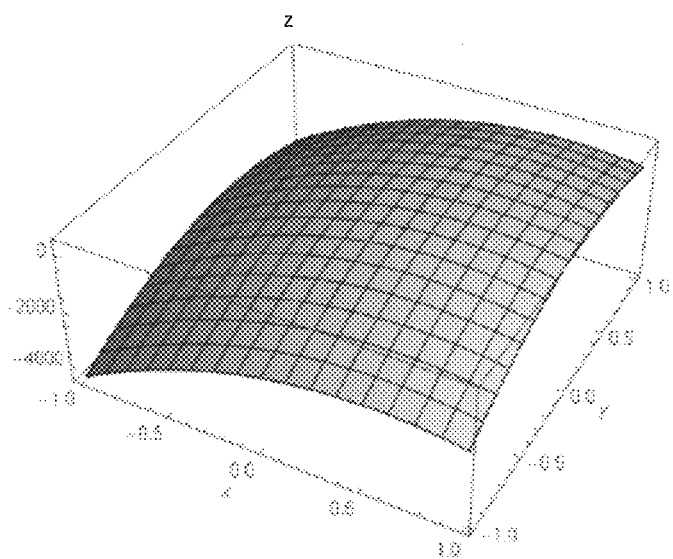
FIG. 10C is a schematic phase distribution diagram of the grating compound lens unit in FIG. 8.
Figure 10D:
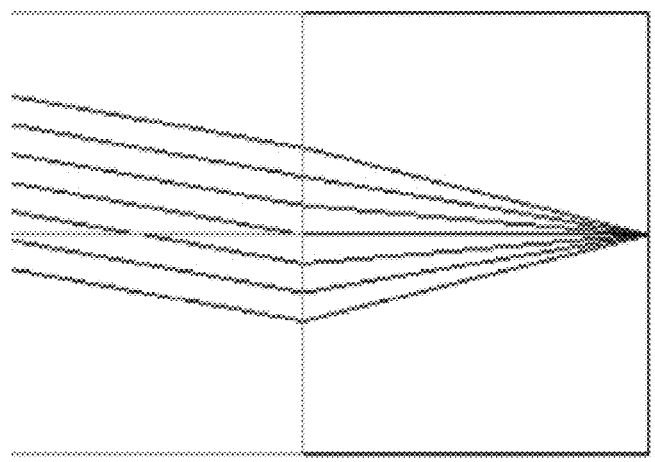
FIG. 10D is a schematic diagram of convergence and deflection effects of the grating compound lens unit in FIG. 8 on light incident thereon.

FIG. 10C exemplarily shows phase distribution of the grating compound lens unit 221 in FIG. 9 (the z axis represents the phase of the grating compound lens unit), and FIG. 10D exemplarily shows an optical path diagram of the grating compound lens unit 221 in FIG. 9. As shown in FIG. 10C, the phase of the grating compound lens unit 221 is asymmetrically distributed with respect to the center (x=0, y=0) of the grating compound lens 221. As shown in FIG. 10D, the grating compound lens unit 221 may deflect light while collimating (or converging) divergent light incident thereon, so that the image-space central visual field direction 2212 of the grating compound lens unit 221 intersects with the extension direction of the optical axis of the grating compound lens 221.

Figure 10E:
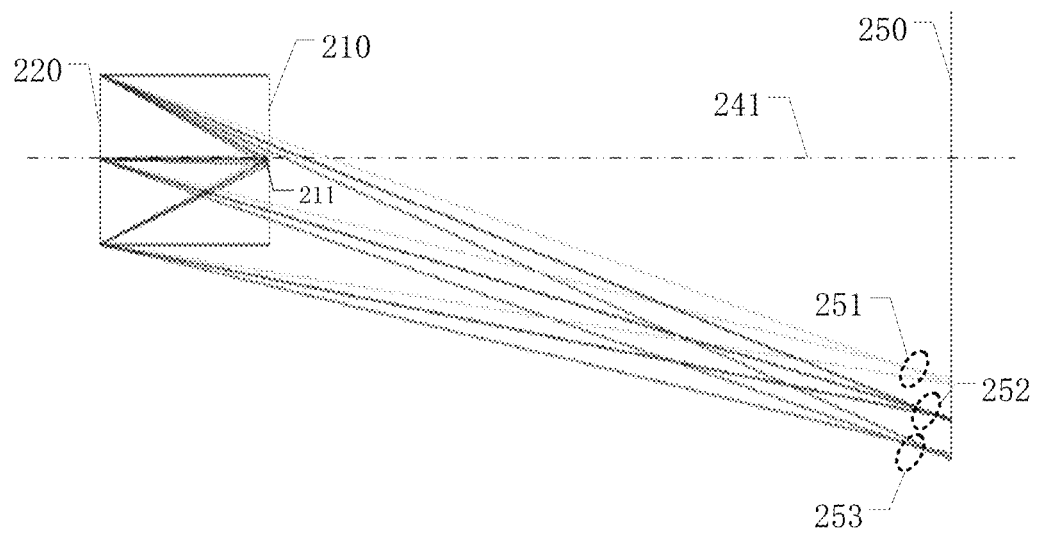
FIG. 10E is a simulation diagram of imaging a display pixel set by the grating compound lens unit in FIG. 8.

FIG. 10E exemplarily shows a simulation diagram of imaging the display pixel set 211 by the grating compound lens unit 221 in FIG. 9 (with ZEMAX simulation software). Light 252 represents light corresponding to a main visual angle, light 251 represents light corresponding to the main visual angle (10°)−3°, and light 253 represents light corresponding to the main visual angle (10°)+3°. As shown in FIG. 10E, a spot size of light corresponding to a same visual angle on the image surface is very small. As shown in FIG. 10E, sizes of light spots formed by the light 251, the light 252 and the light 253 on the image surface are all relatively small, which indicates that the grating compound lens unit 221 of the display device 200 provided by the embodiment of the present disclosure can make imaging within a range near a center of a certain relatively large visual angle (e.g., a visual angle ±3°) have the imaging quality of paraxial imaging. For example, the grating compound lens unit 221 of the display device 200 provided by the embodiment of the present disclosure may convert off-axis imaging in the display device 500 shown in FIG. 1A into paraxial imaging, so that imaging quality of the display device 200 may be improved.

Figure 10F:
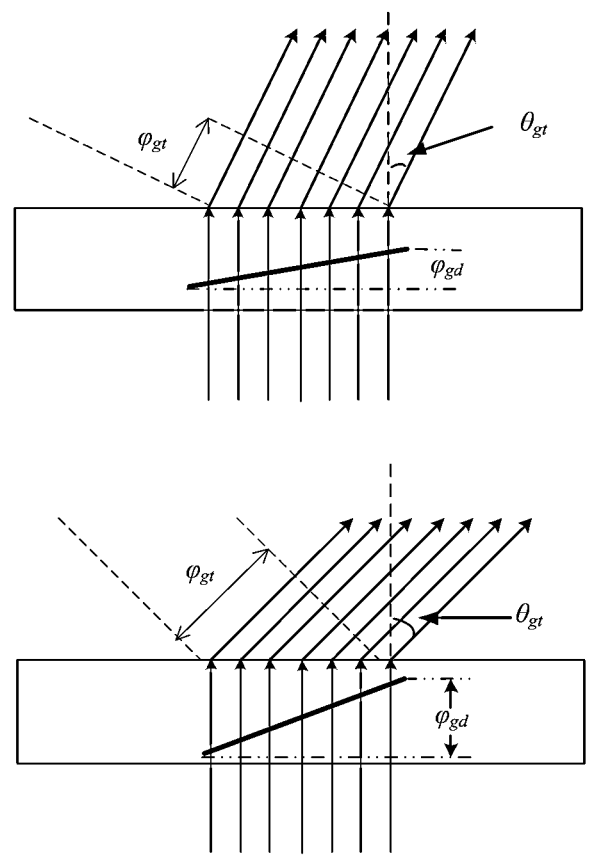
FIG. 10F is a schematic diagram of influence of a phase difference value of the grating unit on the deflection effect of light.

FIG. 10F shows influence of a phase difference value of the grating unit on the deflection effect of light, where the phase difference value of the grating unit refers to a difference between a maximum phase and a minimum phase of the grating unit. As shown in FIG. 10F, when a phase difference value $\varphi_{gd}$ of the grating unit increases, a deflection angle $\theta_{dt}$ of light by the grating unit becomes larger. This is because the larger the deflection angle $\theta_{dt}$ of the light, the larger the light transmission path phase difference $\varphi_{gt}$ caused by light deflection; and thus, the transmission path phase difference $\varphi_{gt}$ may compensate for the phase difference value $\varphi_{gd}$ of the grating unit.

For example, when the phase difference value $\varphi_{gd}$ of the grating unit is larger, and the phase difference value of the grating compound lens unit 221 is larger, a deflection angle of emergent light of the corresponding display pixel set 211 by the grating compound lens unit 221 may be larger. For example, along a direction from the center of the lens layer 220 toward an edge of the lens layer 220, the phase difference value of the grating unit of the grating compound lens unit 221 (or the phase difference value of the grating unit of the grating compound lens unit 221) may be gradually increased, so that along the direction from the center of the lens layer 220 toward the edge of the lens layer 220, the deflection angle of the image-space central visual field direction of the grating compound lens unit 221 gradually increases, and further the imaging points of the corresponding display pixel sets 211 formed by the plurality of grating compound lens units 221 and the imaging point of the central display pixel set 213 formed by the central lens 224 can be spliced into an image to be displayed (e.g., a continuous and non-overlapping picture). Hereinafter, exemplary description will be provided in conjunction with FIG. 9.

For example, as shown in FIG. 9, in the case where the display layer 210 includes a plurality of display pixel sets 211 and the lens layer 220 includes a plurality of grating compound lens units 221, the plurality of grating compound lens units 221 may deflect the corresponding image-space central visual field directions by predetermined angles, for example, make an image-space central visual field direction of each grating compound lens unit 221 pass through the first viewpoint V1. As shown in FIG. 9, image-space central visual field directions 2212 of different grating compound lens units 221 have different predetermined deflection angles; the farther the distance from the center of the grating compound lens unit 221 to the center of the lens layer 220, the larger the predetermined deflection angle that the image-space central visual field direction 2212 of the grating compound lens unit 221 has, so that fields of view of the plurality of grating compound lens units 221 can be spliced with each other to form a larger field of view (e.g., larger than 60°), and thus the imaging points of the plurality of display pixel sets 211 and the imaging point of the central display pixel set 213 formed by the central lens 224 can be spliced into an image to be displayed. For example, imaging points of adjacent display pixel sets 211 are closely adjacent to each other, to form a continuous and non-overlapping picture.

For example, the deflection angle of the imaging point of the corresponding display pixel set 211 may be controlled by setting the phase difference value of the grating compound lens unit 221, where the phase difference value of the grating compound lens unit 221 refers to a difference between a maximum phase and a minimum phase of the grating compound lens unit 221. For example, the larger the phase difference value of the grating compound lens unit 221, the larger the included angle between the image-space central visual field direction 2212 of the grating compound lens unit 221 and the optical axis of the lens unit of the grating compound lens unit 221 (i.e., the larger the deflection angle of the image-space central visual field direction 2212 of the grating compound lens unit 221). For example, along the direction from the center of the lens layer 220 toward the edge of the lens layer 220, the phase difference value of the grating compound lens unit 221 may be gradually increased, so that along the direction from the center of the lens layer 220 toward the edge of the lens layer 220, the included angle between the image-space central visual field direction 2212 of the grating compound lens unit 221 and the optical axis of the lens unit of the grating compound lens unit 221 increases gradually (i.e., the deflection angle of the image-space central visual field direction 2212 of the grating compound lens unit 221 increases gradually), and further the imaging points of the corresponding display pixel sets 211 formed by the plurality of grating compound lens units 221 and the imaging point of the central display pixel set 213 formed by the central lens 224 can be spliced into an image to be displayed (e.g., a continuous and non-overlapping picture).

In some examples of the display device 200 provided by the embodiment of the present disclosure, not only imaging of the central display pixel set 213 by the central lens 224 is paraxial imaging, but also imaging of the display pixel set 211 by the grating compound lens unit 221 is paraxial imaging, so that imaging quality of the lens layer is improved. Therefore, as compared with the solution of off-axis imaging adopted by the display device 500 shown in FIG. 1A and FIG. 1B, the grating compound lens unit 221 may reduce imaging aberration of the lens layer 220 and enhance quality of imaging the display pixel set 211 by the lens layer 220. In this case, when a focal length of the lens layer 220 is fixed, the grating compound lens unit 221 may increase a view angle of the lens layer 220 (e.g., raise the view angle of the lens layer 220 to more than ±60°); and when the view angle is fixed, the focal length of the lens layer 220 may be reduced (e.g., to less than 1 mm), which, thus, may reduce a thickness of the display device 200 and improve use experience of the user. In addition, as compared with the display device 500 shown in FIG. 1A and FIG. 1B, the display pixels 1111 may be evenly arranged on the display layer 210, which, thus, can not only reduce difficulty in designing and fabricating the display layer 210, but also reduce difficulty in aligning the display layer 210 with the lens layer 220.

As shown in FIG. 8, the display device 200 further comprises a spacing layer provided between the display layer 210 and the lens layer 220. For example, the spacing layer may be a spacer substrate; for another example, the spacing layer may also be an air layer, and at this time, the lens layer 220 and the display layer 210 are superimposed on each other by frame bonding.

Figure 11A:
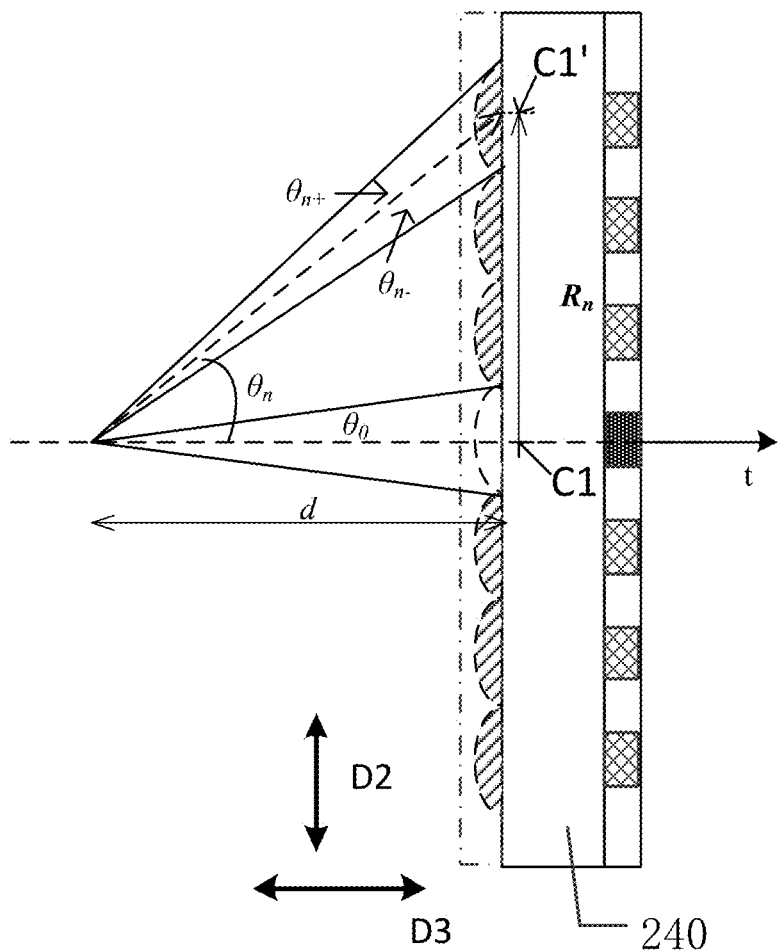
FIG. 11A is a schematic diagram for showing structural parameters of the display device.
Figure 11B:
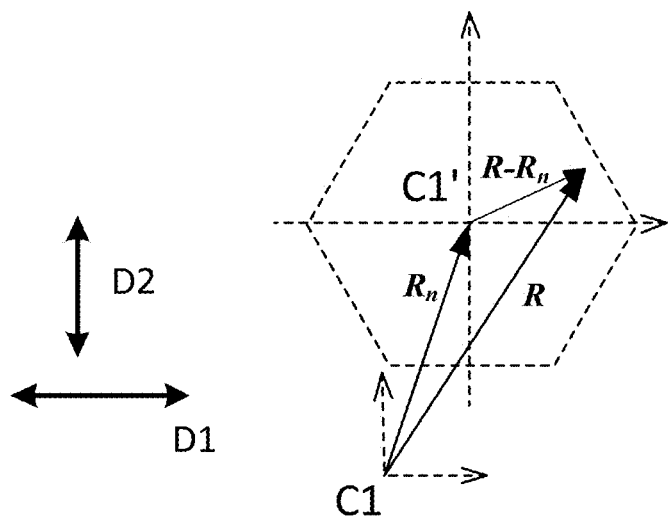
FIG. 11B is a schematic diagram of an orthogonal projection of the grating compound lens unit on a spacing layer.

Hereinafter, a specific arrangement mode of the lens unit and the grating unit will be exemplarily described in conjunction with FIG. 11A and FIG. 11B. As shown in FIG. 11B, an orthogonal projection of the grating compound lens unit 221 on the spacing layer is a hexagon, but the embodiment of the present disclosure is not limited thereto; and according to actual application needs, the orthogonal projection of the grating compound lens unit 221 on the spacing layer may also be a triangle or other suitable shape.

For example, phase distribution of the lens unit $\varphi_{lens}(R)$, phase distribution of the grating Unit $\varphi_{grating}(R)$, the grating period P1, and phase distribution of the grating compound lens unit 221 $\varphi_{cp}(R)$ may respectively satisfy expressions below:

$$\varphi_{lens}(R) = -n\frac{2\pi}{\lambda}\left(\sqrt{(R-R_n)^2 + f^2} - f\right);$$

$$\varphi_{grating}(R) = \frac{2\pi}{\lambda}(R-R_n) \cdot r_{11} \times \sin(\theta);$$

$$P1 = \frac{\lambda}{n \times \sin(\theta)}; \text{ and}$$

$$\varphi_{cp}(R) = \varphi_{lens}(R) + \varphi_{grating}(R).$$

Here, R is a vector from an orthogonal projection of the center of the lens layer 220 on the spacing layer to a position within the orthogonal projection of the grating compound lens unit 221 on the spacing layer, $R_n$ is a vector from the orthogonal projection of the center of the lens layer 220 on the spacing layer to the orthogonal projection of the center of the grating compound lens unit 221 on the spacing layer, f is a focal length of the grating compound lens unit 221, n is a refractive index of the spacing layer, λ is an effective operating wavelength of the display device 200; 0 is an included angle between a vector $r_n$ of the image-space central visual field direction 2212 of the grating compound lens unit 221 and a vector tin a normal direction of the spacing layer, $r_{//}$ is a projection vector of the vector $r_n$ of the image-space central visual field direction 2212 of the grating compound lens unit 221 on the spacing layer.

For example, the phase distribution of the lens unit $\varphi_{lens}(R)$ may be used to implement spherical-aberration-free convergence or collimation preformed on a plane wave by the grating compound lens unit 221. For example, the phase distribution of the lens unit $\varphi_{lens}(R)$ is used to compensate for an optical path difference between different light incident onto different positions of the lens unit caused by different transmission paths, so that different light emitted by the display layer 210 and incident onto different positions of the lens unit go through a same optical path.

For example, the phase distribution of the grating unit $\varphi_{grating}(R)$ is used to deflect light incident thereon, so that the grating compound lens unit 221 may deflect the light while collimating the light incident thereon, and thus the image-space central visual field direction 2212 of the grating compound lens unit 221 intersects with the extension direction of the optical axis of the grating compound lens 221. Therefore, in the case where imaging of a corresponding display pixel set 211 by each grating compound lens unit 221 satisfies paraxial imaging, the grating compound lens unit 221 may deflect an image-space optical path to a predetermined field of view, so as to splice imaging points of different display pixel sets 211 and the imaging point of the central display pixel set 213 to form an image to be displayed (splice on the image surface 250 of the display device), which, in this case, can not only improve imaging quality of the lens layer 220, but also increase an image-space field of view of the display device 200 and/or reduce a size of the display device 200.

For example, in some embodiments, in addition to introducing the phase of the grating unit in the grating compound lens unit 221, according to actual application needs, an aberration correction phase may also be introduced in the grating compound lens unit 221, which, thus, may further enhance imaging quality of the grating compound lens unit 221. For example, the aberration correction phase may be expressed by using a Zernike polynomial. For example, a suitable Zernike polynomial may be selected based on a type of aberration desired to be corrected, and a phase corresponding to the Zernike polynomial may be introduced into the grating compound lens unit 221. Related technologies may be referred to for a relationship between the Zernike polynomial and aberration, and no details will be repeated here.

As shown in FIG. 8 and FIG. 9, the lens unit and the grating unit may be integrated into a phase-type grating compound lens unit 221; as compared with a type of grating compound lens unit 221 with the lens unit and the grating unit separately provided, the integrated phase-type grating compound lens unit 221 may better control a convergence angle (a difference between a divergence angle of light incident onto the grating compound lens unit 221 and a divergence angle of light emergent from the grating compound lens unit 221) and a deflection angle of light, and thus may further improve an imaging effect. For example, the phase of the lens unit and the phase of the grating unit may be simultaneously introduced into a material for fabricating the phase-type grating compound lens unit 221, so that the lens unit and the grating unit may be integrated into the phase-type grating compound lens unit 221.

For example, the grating compound lens unit 221 may be implemented as a planar lens. It should be noted that, the planar lens according to the embodiment of the present disclosure refers to a lens that can implement an imaging function without a curved surface profile of an ordinary geometric lens. For example, the grating compound lens unit 221 based on a planar lens, for example, will not be limited to factors such as lens surface profile and material refractive index like ordinary geometric lenses, which, thus, may further improve design flexibility of the grating compound lens unit 221. For another example, the planar lens may implement imaging without aberration (e.g., without spherical aberration), and thus the grating compound lens unit 221 that may be based on the planar lens may further improve imaging quality of the lens layer 220. In some examples, a surface of the planar lens may have a stepped structure with a relatively small size, without a curved surface profile; for example, the planar lens may be a binary optical lens. In other examples, a surface of the planar lens may be a flat surface, for example, the planar lens may be a lens based on super-surface phase control or a lens based on a holographic material.

For example, in the case where the grating compound lens unit 221 is implemented as a binary optical lens, for example, an overlay (i.e., multiple etching) process or an imprinting process for a multi-step structure may be used (a phase order is, for example, N, and in a case of the overlay process, the number of processes is, for example, log 2 N); and a thickness of the lens layer 220 is, for example, 5 microns to 10 microns (a size of a typical phase modulation unit is on an order of microns). For example, since the binary optical lens is usually insensitive to polarization, it may modulate natural light. For example, since the binary optical lens has relatively great dispersion, a display panel with a relatively narrow luminescence spectrum may be selected as the display layer 210. For example, an organic light emitting diode (OLED) display panel, a micro light emitting diode (micro LED) display panel, or a quantum dot liquid crystal display panel (LCD) may be selected.

For example, in the case where the grating compound lens unit 221 is implemented as a lens based on super-surface phase control (e.g., a Superlens, a Metalens), the lens layer 220 may be fabricated based on a semiconductor fabricating process (e.g., at least one of a single photoetching process and a single imprinting process). For example, the grating compound lens unit 221 may include phase modulation units arranged in parallel, and width W, length L, height H and pitch P of the phase modulation units may satisfy, for example, W=95 nm, L=250 nm, H=600 nm, and P=325 nm. For example, the lens layer 220 may have a tabulate shape. For example, the grating compound lens unit 221 based on super-surface phase control has characteristics below: the grating compound lens unit has high phase modulation accuracy (e.g., since the phase modulation unit is scaled on an order of sub-wavelengths), so that aberration of the grating compound lens unit 221 may be further reduced; a thickness of the grating compound lens unit is small (the thickness of the grating compound lens unit 221 is on an order of sub-wavelengths), so the thickness of the display device 200 may be further reduced; phase control is implemented based on polarization, so a display panel that can output circularly polarized light or linearly polarized light may be selected as the display layer 210; and dispersion controllability is better (as compared with that of a conventional binary optical diffraction device), so requirements for a spectral width of light output by the display layer 210 is relatively low. For example, in this case, the display layer 210 may be a display panel such as an OLED, a micro LED, or a quantum dot LCD, and include a device for performing polarization modulation on light output by the display panel.

In the case where the grating compound lens unit 221 is implemented as a lens based on a holographic material, the grating compound lens unit 221 has, for example, characteristics below. Firstly, phase modulation accuracy of the grating compound lens unit 221 is high (which theoretically may approach to continuous modulation), so aberration of the grating compound lens unit 221 may be further reduced. Secondly, the thickness of the grating compound lens unit 221 is relatively small, so the thickness of the display device 200 may be better reduced. For example, the thickness of the grating compound lens unit 221 is about 2 microns to 20 microns, and in the case where the thickness of the grating compound lens unit 221 is 2 microns to 3 microns, a corresponding index modulation degree is relatively high (e.g., 0.2). Thirdly, the grating compound lens unit 221 may be implemented by forming a Bragg volume grating structure, so that efficiency (e.g., diffraction efficiency) of the grating compound lens unit 221 may be improved; and at this time, a predetermined exposure light source may be used to form desired phase distribution in advance. In addition, the grating compound lens unit 221 has dispersion, so the display layer 210 may be a display panel such as an OLED, a micro LED and a quantum dot LCD. In the case where a polarization-sensitive material is selected for fabricating the grating compound lens unit 221, the display layer 210 further includes a device for performing polarization modulation on light output by the display panel.

Hereinafter, setting parameters of the display device 200 will be exemplarily described in conjunction with FIG. 11A. As shown in FIG. 11A, an exit pupil distance d of the display device 200 is, for example, about 10 mm to 14 mm (e.g., 12 mm). For example, a diameter D of the grating compound lens unit 221 may be set based on a diffraction angle of the grating compound lens unit 221 and angle resolution of a human eye (e.g., 2'); and the diameter of the grating compound lens unit 221 is, for example, 1 mm to 2 mm (e.g., greater than 1.15 mm). It should be noted that, in the case where the orthogonal projection of the grating compound lens unit 221 on the display layer 210 is not a circle, the diameter D of the grating compound lens unit 221 refers to a minimum diameter of a circle that can surround the orthogonal projection of the grating compound lens unit 221 on the display layer 210. For example, the focal length of the grating compound lens unit 221 is approximately equal to the diameter D of the grating compound lens unit 221, so an F-number (f/D) of the grating compound lens unit 221 and the thickness of the display device 200 are approximately equal to 1.

An object distance $l_o$, an image distance $l_{img}$ and the focal length of the grating compound lens unit 221 satisfy an expression below:

$$\frac{1}{l_o} + \frac{1}{-l_{img}} = \frac{1}{f}.$$

The image distance $l_{img}$ of the grating compound lens unit 221 is, for example, 1 meters to 6 meters (e.g., 2 meters), and correspondingly, the object distance $l_o$ of the grating compound lens unit 221 is approximately equal to the focal length f of the lens. The focal length f of the grating compound lens unit 221 is equal to a pitch between the display layer 210 and the lens layer 220.

It should be noted that, the above description is exemplary description of the embodiment of the present disclosure by taking that the display layer includes the central display pixel set located in the center of the display layer and the display pixel sets arranged in an array around the central display pixel set, and the lens layer includes the central lens located in the center of the lens layer and the grating compound lens units arranged in an array around the central lens of the lens layer as an example, but the embodiment of the present disclosure is not limited thereto.

For example, according to actual application needs, the display layer may not be provided with the central display pixel set, and the lens layer may not be provided with the central lens (e.g., the lens layer includes only grating compound lens units, and any two adjacent grating compound lens units are connected with each other); in this case, the grating unit in the grating compound lens unit is configured to deflect the light for imaging, so that the image-space central visual field directions of different grating compound lens units, for example, may pass through a same point (e.g., pass through the first viewpoint V1), and thus, image points of different display pixel sets can be spliced into an image to be displayed. Therefore, for example, each display pixel set may be imaged by paraxial imaging.

In one example, the lens layer may further include a grating unit corresponding to the central lens, and the grating unit corresponding to the central lens and the lens layer are, for example, stacked; in this case, light incident to the central lens will be incident onto the grating unit corresponding to the central lens after leaving the central lens, and the grating unit corresponding to the central lens deflects the light leaving the central lens and incident onto the grating unit corresponding to the central lens. In another example, the lens layer may not include a grating unit corresponding to the central lens; in this case, light incident to the central lens will, for example, be directly transmitted to a position where the viewpoint of the display device is located after leaving the central lens.

For example, the center of the lens layer is configured as an optical center of the display device; and when the display device is being designed and fabricated, the center of the lens layer may be used as a reference. For example, an orthogonal projection of the viewpoint of the display device on the lens layer may coincide with the center of the lens layer. For example, the center of the lens layer may be a center of a physical structure of the lens layer, so as to improve quality of a display image of the display device as much as possible; and for another example, the center of the lens layer may not be the center of the physical structure of the lens layer. For example, in the case where the lens layer includes the central lens, the center of the lens layer and the center of the central lens coincide with each other.

It should be noted that, for the sake of clarity (e.g., to clearly show splicing between different grating compound lens units), FIG. 3A to FIG. 3C and FIG. 9 only show a portion of light leaving the grating compound lens unit, so it seems that the grating compound lens unit converts the light incident thereon into a convergent light beam; however, when the display device operates, the grating compound lens unit is configured to form a virtual image of the corresponding display pixel set, so the light emergent from the grating compound lens unit and incident to the viewpoint of the display device (incident to the user's eye) is not convergent light. It should be noted that, between the grating compound lens unit and the display pixel set, only light emitted by a display pixel located at the center of the display pixel set is shown (i.e., only a portion of the light incident to the grating compound lens unit is shown), and other portion of the light incident to the grating compound lens unit is not shown; on a side of the grating compound lens unit that is away from the display layer (e.g., a side close to the human eye), in order to demonstrate splicing effects of different grating compound lens units with respect to the field of view of the human eye (i.e., in order to demonstrate that image-space fields of view of different grating compound lens units can be spliced into a larger field of view under a deflection effect of the grating compound lens units on the image-space fields of view), FIG. 3A to FIG. 3C and FIG. 9 show an angle range of light integrally emitted by the display pixels included in the display pixel sets, passing through the corresponding grating compound lens units, and reaching the human eye (i.e., an angle range of light emergent from the grating compound lens units that is incident to the human eye), so FIG. 3A to FIG. 3C and FIG. 9 lead to illusion that the light is converged into the human eye (i.e., actually, light incident to the human eye is not convergent light). For example, the divergence angle of the light emergent from the grating compound lens unit is smaller than the divergence angle of the light emitted by the display pixel set and incident to the grating compound lens unit, so the image surface of the display device is located on a side of a light-emitting surface of the display layer that is away from the lens layer (e.g., a side of the display layer that is away from the lens layer). For example, the divergence angle of the light emergent from the grating compound lens unit may be approximate to zero, and in this case, the image surface (an image surface of the virtual image) of the display device may be located at infinity. For example, the grating compound lens unit has convergence. It should be noted that, the fact that the grating compound lens unit has convergence refers to that the grating compound lens unit can make the divergence angle of the light emergent from the grating compound lens unit smaller than the divergence angle of the light emitted by the display pixel set and incident to the grating compound lens unit, and does not refer to that the grating compound lens unit has an effect such that the light emergent from the grating compound lens unit is convergent light. For example, FIG. 10D may be referred to for an example of convergence and deflection effects of the grating compound lens unit on the light incident thereon.

In some examples of the present disclosure, the viewpoint of the display device may be a center of a virtual window (observation region) for human eye observation; and the user may observe the image displayed by the display device when the user's eyes are located at the viewpoint of the display device.

For example, the grating compound lens unit is configured to perform appropriate paraxial or off-axis optical imaging on the display pixel set, to expand an angle of the overall imaging field of view of the lens layer, so that use experience of the user may be improved.

For example, the image-space central visual field direction of the grating compound lens unit is the transmission direction of the light emitted by the display pixel set and incident to the optical center of the grating compound lens unit after leaving the grating compound lens unit. For another example, with respect to a specific combination structure of a grating compound lens unit and a display pixel set, the image-space central visual field direction of the grating compound lens unit is an extension direction of a line connecting the viewpoint of the display device (i.e., the corresponding viewpoint in front of the human eye) and the optical center of the grating compound lens unit. For another example, the image-space central visual field direction of the grating compound lens unit is a direction of a certain pixel on a virtual image plane corresponding to the connection line between the viewpoint of the display device and the optical center of the grating compound lens unit relative to the viewpoint of the display device (i.e., the corresponding viewpoint in front of the human eye).

For example, the optical axis of the grating compound lens is the optical axis of the lens unit of the grating compound lens unit.

The embodiments of the present disclosure provide a display device. In some examples, the grating compound lens unit may be used to image the display pixel set and deflect the light for imaging, so that the image-space central visual field direction of the grating compound lens unit intersects with the extension direction of the optical axis of the grating compound lens unit, and thus the display pixel set may be imaged by paraxial imaging. Therefore, quality of imaging the display layer by the lens layer may be improved, which, thus, may reduce the focal length of the lens layer and/or improve the image-space field of view of the display device.

Although detailed description has been given above to the present disclosure with general description and embodiments, it shall be apparent to those skilled in the art that some modifications or improvements may be made on the basis of the embodiments of the present disclosure. Therefore, all the modifications or improvements made without departing from the spirit of the present disclosure shall all fall within the scope of protection of the present disclosure.

What are described above is related to the illustrative embodiments of the disclosure only and not limitative to the scope of the disclosure; the scopes of the disclosure are defined by the accompanying claims.

What is claimed is:
1. A display device, comprising a display layer and a lens layer,
wherein the lens layer is provided on a light emergent side of the display layer, and includes at least one grating compound lens unit;
the display layer includes at least one display pixel set, and the display pixel set is configured to emit light for imaging toward the grating compound lens unit during display;
the grating compound lens unit is configured to optically image the display pixel set; and the grating compound lens unit is further configured to deflect the light for imaging, to make an image-space central visual field direction of the grating compound lens unit intersect with an extension direction of an optical axis of the grating compound lens unit, so that the display device has one or more viewpoints, wherein the lens layer includes a plurality of grating compound lens units; the plurality of grating compound lens units include a first grating compound lens unit and a second grating compound lens unit the second grating compound lens unit is farther away from a center of the lens layer than the first grating compound lens unit and a grating period of the second grating compound lens unit is smaller than a grating period of the first grating compound lens unit; and wherein a phase difference value of a grating unit of the second grating compound lens unit is greater than a phase difference value of a grating unit of the first grating compound lens unit the phase difference value of the grating unit of the second grating compound lens unit is a difference between a maximum phase of the grating unit of the second grating compound lens unit and a minimum phase of the grating unit of the second grating compound lens unit and the phase difference value of the grating unit of the first grating compound lens unit is a difference between a maximum phase of the grating unit of the first grating compound lens unit and a minimum phase of the grating unit of the first grating compound lens unit.

2. The display device according to claim 1, wherein the grating compound lens unit includes a lens unit and a grating unit;

the lens unit is configured to optically image the display pixel set; and the grating unit is configured to deflect the light for imaging, so that the image-space central visual field direction of the grating compound lens unit intersects with an extension direction of an optical axis of the lens unit.

3. The display device according to claim 2, wherein the lens layer further includes a central lens arranged in parallel with the grating compound lens unit;

the display layer further includes a central display pixel set arranged in parallel with the display pixel set;

the central display pixel set is configured to emit light for imaging toward the central lens during display;

the central lens is configured to allow the light for imaging that is emitted by the central display pixel set to form an imaging point of the central display pixel set; and the grating unit is configured to enable an imaging point of the display pixel set and the imaging point of the central display pixel set are spliced into at least a portion of an image to be displayed of the display device by making the image-space central visual field direction of the grating compound lens unit intersect with the extension direction of the optical axis of the lens unit.

4. The display device according to claim 2, wherein the lens unit and the grating unit are attached to and stacked with each other; and the lens unit is closer to the display layer than the grating unit.

5. The display device according to claim 2, wherein the lens unit and the grating unit are integrated into a phase-type lens; and the phase-type lens is configured to deflect the image-space central visual field direction of the grating compound lens unit from the optical axis of the lens unit while imaging the display pixel set.

6. The display device according to claim 5, wherein a phase of the lens unit is symmetrically distributed with respect to a center of the grating compound lens unit; and a phase of the grating compound lens unit is asymmetrically distributed with respect to the center of the grating compound lens unit.

7. The display device according to claim 5, wherein the grating compound lens unit is at least one selected from the group consisting of a binary optical lens, a lens based on super-surface phase control, and a lens based on a holographic material.

8. The display device according to claim 2, wherein the grating unit includes a plurality of grating lines, and alignment directions of the plurality of grating lines are parallel to each other.

9. The display device according to claim 2, wherein the grating unit includes a plurality of grating sub-regions; and the plurality of grating sub-regions are configured to deflect light incident to different grating sub-regions toward different directions, so that the display device has of the more viewpoints.

10. The display device according to claim 9, wherein an arrangement mode of the plurality of viewpoints is row arrangement, cross arrangement, matrix arrangement, or snow-flake like arrangement.

11. The display device according to claim 9, wherein the grating compound lens unit includes a first grating compound lens sub-region and a second grating compound lens sub-region;

an included angle between an image-space central visual field direction of the first grating compound lens sub-region and an optical axis of a lens unit of the first grating compound lens sub-region is a first angle, and an included angle between an image-space central visual field direction of the second grating compound lens sub-region and an optical axis of a lens unit of the second grating compound lens sub-region is a second angle;

the first angle is not equal to the second angle, so that the grating compound lens unit forms different viewpoints.

12. The display device according to claim 11, wherein the first grating compound lens sub-region includes a first grating sub-region, and the second grating compound lens sub-region includes a second grating sub-region;

a grating period of the first grating sub-region and a grating period of the second grating sub-region are different from each other; and a grating line direction of a grating unit of the first grating sub-region and a grating line direction of a grating unit of the second grating sub-region are the same; or the grating line direction of the grating unit of the first grating sub-region and the grating line direction of the grating unit of the second grating sub-region are different from each other; and the grating period of the first grating sub-region and the grating period of the second grating sub-region are the same.

13. The display device according to claim 11, wherein a grating period of the first grating sub-region and a grating period of the second grating sub-region are different from each other; and a grating line direction of the grating unit of the first grating sub-region and a grating line direction of the grating unit of the second grating sub-region are different from each other.

14. The display device according to claim 2, further comprising a spacing layer, wherein the spacing layer is provided between the display layer and the lens layer;

phase distribution of the lens unit $\varphi_{lens}(R)$ satisfies an expression below:

$$\varphi_{lens}(R) = -n\frac{2\pi}{\lambda}\left(\sqrt{(R-R_n)^2 + f^2} - f\right);$$

where R is a vector from an orthogonal projection of the center of the lens layer on the spacing layer to a position within the orthogonal projection of the grating compound lens unit on the spacing layer, $R_n$ is a vector from the orthogonal projection of the center of the lens layer on the spacing layer to the orthogonal projection of the center of the grating compound lens unit on the spacing layer, f is a focal length of the grating compound lens unit, n is a refractive index of the spacing layer, and λ is an effective operating wavelength of the display device.

15. The display device according to claim 14, wherein phase distribution of the grating unit $\varphi_{grating}(R)$ and the grating period P1 respectively satisfy expressions below:

$$\varphi_{grating}(R) = \frac{2\pi}{\lambda}(R - R_n) \cdot r_{//} \times \sin(\theta);$$

$$P1 = \frac{\lambda}{n \times \sin(\theta)};$$

where θ is an included angle between a vector $r_n$ of the image-space central visual field direction of the grating compound lens unit and a vector t in a normal direction of the spacing layer, and $r_{//}$ is a projection vector of the vector $r_n$ of the image-space central visual field direction of the grating compound lens unit on the spacing layer.

16. The display device according to claim 1, wherein the display pixel set includes at least one display pixel; and an orthogonal projection of the display pixel set on the lens layer is located within the grating compound lens unit.

17. The display device according to claim 16, wherein a center of the grating compound lens unit is spaced apart from the center of the lens layer; and a center of the orthogonal projection of the display pixel set on the lens layer substantially coincides with the center of the grating compound lens unit.

18. The display device according to claim 17, wherein the display layer further includes a spacing region provided around the display pixel set to space apart adjacent display pixel sets;

and the spacing region is configured as a non-display region; and the display pixel set includes a plurality of the display pixels; the spacing region includes a plurality of driving elements; and the plurality of driving elements are used to drive the corresponding display pixel set.

* * * * *